United States Patent [19]
Malkin et al.

[11] Patent Number: 6,028,938
[45] Date of Patent: Feb. 22, 2000

[54] SECURE ELECTRONIC FORMS PERMITTING LAYOUT REVISION

[75] Inventors: Wayne Allan Malkin; Charles David Perman, both of Edmonton, Canada

[73] Assignee: Shana Corporation, Alberta, Canada

[21] Appl. No.: 08/760,002

[22] Filed: Dec. 3, 1996

Related U.S. Application Data

[60] Provisional application No. 60/018,675, May 30, 1996.

[51] Int. Cl.⁷ ...................................................... H04K 1/00
[52] U.S. Cl. ................................... 380/25; 380/3; 380/18
[58] Field of Search .................................... 707/505, 507, 707/517, 522, 523

[56] References Cited

U.S. PATENT DOCUMENTS 4,458,109  7/1984  Muller-Schloer ........................ 380/23
5,848,158  12/1998  Saito et al. ................................ 380/21

OTHER PUBLICATIONS

Xerox Corporation, Printer, News Release, p. 1, Sep. 11, 1991.

*Primary Examiner*—Gail O. Hayes
*Assistant Examiner*—Christopher M. Tucker
*Attorney, Agent, or Firm*—McDermott, Will & Emery

[57] ABSTRACT

Techniques for ensuring the security of forms data are disclosed. The layout for a particular form is signed separately from the data used to fill out the form using encryption techniques. The signed data is related to the signed layout in a way which permits the layout to be changed without requiring the data to be changed while still guaranteeing that a changed layout does not change the original meaning of the signed data.

32 Claims, 21 Drawing Sheets

```
DISPLAY SCREEN PROCEDURE:
DEFINE LOCAL VARIABLES:
   EMPLOYEE_PICTURE ARRAY;
   EMPLOYEE_NAME; JOB_TITLE;
   SALARY; DEPARTMENT;
   SUPERVISOR
OPEN WINDOW 1 (X₁ Y₁  X₂ Y₂);
CALL LOGOFILE;
OPEN WINDOW 1 (X₃ Y₃  X₄ Y₄);
DISPLAY EMPLOYEE_PICTURE ARRAY;
MOVE CURSOR TO LOC 1;
DISPLAY "EMPLOYEE NAME: ", EMPLOYEE_NAME;
LINERETURN; LINERETURN;
DISPLAY "JOB TITLE: ", JOB_TITLE;
LINERETURN; LINERETURN;
DISPLAY "SALARY: ", SALARY;
LINERETURN; LINERETURN;
DISPLAY "DEPRTMENT: ", DEPARTMENT;
LINERETURN; LINERETURN;
DISPLAY "SUPERVISOR: ", SUPERVISOR;
RETURN.
LOGOFILE PROCEDURE:
DISPLAY 7A34, 7A39, 82F5, ...
............. FFFF.
```

Figure 5

FORM 756, EMPLOYEE RECORD LAYOUT, REVISION 3

SECURE ELECTRONIC FORMS PERMITTING LAYOUT REVISION

RELATED APPLICATION

This application claims the priority date of application serial no. 60/018,675, filed May 30, 1996 (Attorney Docket No. 787-014PRO) filed by Wayne Malkin and Dave Perman, and entitled SECURE ELECTRONIC FORMS PERMITTING LAYOUT REVISION.

TECHNICAL FIELD

The invention relates to computer systems, and, more particularly, to computer systems which handle electronic forms in a secure manner.

BACKGROUND ART

Encryption of information is normally undertaken to ensure privacy, that is, so that no one other than the intended recipient can decipher the information. Encryption is also undertaken to ensure the authenticity of the information, that is, that a message which purports to originate with a particular source actually does originate with that source and has not been tampered with.

"Encrypting" or "enciphering" a message means to scramble it in a way which renders it unreadable to anyone except the intended recipient. In one form, a cryptographic "key" is utilized to encrypt the message and the same key is required to transform it from encrypted form back to plain text by deciphering or decrypting it. An encryption system which operates in this way is known as a "single-key" encryption system. In such a system, the key must be available to both the sender and the receiver. If an unauthorized person has access to the key, then they can decrypt the encoded message and the object of privacy is defeated. The most obvious drawback of single key encryption systems is that it is not often convenient to provide the sender and the receiver with keys. They may be located far apart. A key can be transmitted across a secure channel from the sender to the receiver, but if a secure channel is available, there is no need for encryption.

In a public key encryption system each participant has two related keys. A public key which is publicly available and a related private key or secret key which is not. The public and private keys are duals of each other in the sense that material encrypted with the public key can only be decrypted using the private key. Material encrypted with the private key, on the other hand, can be decrypted only using the public key. The keys utilized in public key encryption systems are such that information about the public key does not help deduce the corresponding private key. The public key can be published and widely disseminated across a communications network or otherwise and material can be sent in privacy to a recipient by encoding the material with the recipient's public key. Only the recipient can decrypt material encrypted with the recipient's public key. Not even the originator who does the encryption using the recipient's public key is able to decrypt that which he himself has encrypted.

Message authentication can also be achieved utilizing encryption systems. In a single key system, a sender, by encrypting a message with a key known only to authorized persons, tells the recipient that the message came from an authorized source.

In a public key encryption system, if the sender encrypts information using the sender's secret key, all recipients will be able to decipher the information using the sender's public key, which is available to all. The recipients can be assured that the information originated with the sender, because the public key will only decrypt material encoded with the sender's secret key. Since presumably, only the sender has the secret key, the sender cannot later disavow that he sent the information.

The use of encryption techniques provides a basis for creating electronic signatures to documents which are even less subject to forgery than handwritten signatures. There are two ways in which encryption can be utilized to "sign" a document. The first method is by encrypting the entire document using the signer's secret key. The document can be read by anyone with the signer's public key and, since the signer alone possesses his secret key, the encrypted document surely originated with the signer.

Encryption of large documents requires considerable computational resources and, to speed up the signing process, a message digest may be used. A message digest of the document is analogous to a cyclic redundancy code (CRC) check sum attached to the end of a packet. The information in the body of the packet is processed mathematically to produce a unique check sum which is appended to the end of the packet. The integrity of the body of the packet is checked at the receiving end by recalculating the check sum based on the received text and seeing if it matches the check sum appended to the packet. If it does, one assumes that the contents of the body of packet is unchanged from that present at the sending end. The same can be done with entire documents.

In modern implementations, a message digest is created using a cryptographically strong one way hash function between the message text and the output digest and the message digest operates like a CRC check sum.

A clear text document may be signed by creating the message digest and then by encrypting the message digest using the signer's secret key. Authentication that the content of the document has not been changed is achieved by computing the same one way hash function of the received text, from the text, and comparing it with the message digest decrypted using the signer's public key. If they agree, one may have a high degree of confidence that the document has been unchanged from the time it was signed, until the present and further, that that which the sender "signed" was the same document.

Public key encryption software is widely available. For example, Pretty Good™ Privacy public key encryption software is available for non-commercial use over the Internet in a form published by Phillip Zimmerman. One version, is PGP version 2.6.2 of Oct. 11, 1994. It is available from the Massachusetts Institute of Technology at net-dis.mit.adu, a controlled FTP site that has restrictions and limitations to comply with export control requirements. Software resides in the directory /pub/PGP. A fully licensed version of PGP for commercial use in the U.S.A. and Canada is available through ViaCrypt in Pheonix, Ariz.

Some public key encryption systems utilize a single key encryption of the body of the text with the key changing from session to session and with the key encrypted utilizing the recipient's public key to encrypt the session key so that the encoding and decoding times are quicker.

No data security system is impenetrable. In any data security system, one must question whether the information protected is more valuable to an attacker than the cost of the attack. Public key encryption systems are most vulnerable if the public keys are tampered with.

An example will illustrate the problem. Suppose an originator wishes to send a private message to a recipient. The originator could download the recipient's public key certificate from an electronic bulletin board system and then encrypt the letter to the recipient with that public key and send it to him over an E-mail facility such as Internet. Unfortunately, an interloper has generated a public key of his own with the recipient's user ID attached to it and substituted the phony public key in place of the recipient's real public key. If the originator unwittingly uses the phony key belonging to the interloper instead of to the intended recipient, everything would look normal because the phony key has the recipient's user ID. Now the interloper is in a position to decipher the message intended for the recipient because the interloper has the related secret key. The interloper may even go so far as to reencrypt the deciphered message with the recipient's real public key and send it on to the recipient so that no one suspects any wrongdoing. Worse yet, the interloper can make apparently good signatures from the recipient using the secret key because everyone will believe the phony public key is authentic and will utilize it to check the recipient's signatures.

To prevent this from happening, requires preventing someone from tampering with public keys. If one obtained the recipient's public key directly from the recipient, there is no doubt about the authenticity of the public key. However, where the public key is acquired from a source of uncertain reliability, there may still be a problem. One way to obtain the recipient's public key would be to obtain it from a trusted third party who knows he has a good copy of the recipient's public key. A trusted third party could sign the recipient's public key, utilizing the trusted third party's private key, thus vouching for the integrity of the recipient's public key. However, to be sure that the third party's public key is authentic, requires that the sender have a known good copy of the third party's public key with which to check his signature. A widely trusted third party could specialize in providing a service of vouching for the public keys of other parties. This trusted third party could be regarded as a key server or as a certifying authority. Any public key certificates bearing the certifying authority's signature would be trusted as truly belonging to whom they appear to belong to. Users who desire to participate would need a known good copy of the certifying authority's public key so that the certifying authority's signatures could be verified.

Secure data interchange over public networks is currently being actively investigated and tested in many different applications. Electronic commerce over the Internet is a much publicized application of secure data interchange, and a number of solutions are being proposed. However, widespread transmission of messages, documents, and other information via non-secure networks is being delayed by the difficult task of ensuring the identity of the parties involved in a transaction and the integrity of the messages.

There are five key elements that designers are trying to consider when building applications for secure electronic systems.

Encryption—the encoding of messages for secure communications.

Authentication—the ability to ensure that the originators of a message or transaction are who they claim to be.

Certification—the guarantee, via a trusted third party, that authentications are valid.

Confirmation—obtaining an electronic receipt of a transaction.

Non-repudiation—the establishment of an undeniable means of identifying the parties in a transaction.

Of these five elements, the most difficult to achieve is non-repudiation. In digital signature applications, non-repudiation means that the digital signature must be an unforgeable piece of data that asserts the identity of the person named in the signature. For transactions involving digital signatures to be trusted, it must be possible to easily prove to a third party that the signed parties cannot repudiate the veracity of the signatures, or the content of the signed document.

Associating an Individual Identity with a public/private key pair is the responsibility of the issuing authority. One method of establishing trust in individual identities is to build a "trust hierarchy". In its simplest form, a central issuing authority would be responsible for issuing all certificates and would vouch for the identity of each individual.

In practice, the process must be spread out over several layers. A central authority vouches for the identity of other authorities, which can each then vouch for the identity of other entities within their respective scopes. For example, RSA acts as one top level authority. RSA issues a certificate to Apple Computer, which in turn issues certificates to each of its employees. Thus an individual certificate contains the public key for the individual, as well as the public keys of Apple Computer and RSA.

At the top level, governments may wish to establish methods of certifying each other's identity, which would allow validation of signatures on a global scale.

Seventy-five percent of all forms involve either financial transactions or human resource information, both of which are considered very sensitive. For this reason, securing form data is often considered to be a top priority.

This data must be secured against unauthorized viewing (privacy), and must also be signed electronically as a means of both identifying the author and securing the data against tampering.

Interchange of Secured Data

Exchange Between Platforms—Exchanging encrypted and/or authenticated data between platforms, but within a single application, includes two main issues. First is the availability of the cryptographic tools on the various platforms. Second is the representation of the data within the application.

Cryptographic Tools—This is really just a choice of which cryptographic system is used by the application to provide encryption and authentication services. Ideally, the provider of these tools should be making them available on any relevant platforms, and should be ensuring that the format of the data generated and interpreted by the tools is platform independent.

An example of a good, platform independent tool is Entrust, from NorTel.

Data Representation in Applications—This issue relates to the exact format, down to individual bits and bytes, of the data that is to be encrypted or authenticated. For an application to work in a multiple platform environment, the data format must already have been established in a platform independent manner, so encryption of this data would be simple at the file level. However, encryption may also be needed for selected portions of a document, such as particular records in a database, so this must be accounted for in the structure of the document.

When data is to be signed (authenticated), the stream of bytes that is passed to the cryptographic system for digesting must also be platform independent. This may require the specification of a platform independent format for digesting within the application.

Exchange Between Vendors—Additional issues arise when one considers the interchange of secured data between different representations of that data. Interchange of encrypted data can only proceed if the data can be decrypted and then re-encrypted in the new representation. Digital signatures cannot be preserved at all.

Encryption—In order to change the representation of some encrypted data, the data must be decrypted, translated, and then encrypted again in its new representation. This is a simple process as long as the data is simply encrypted for local storage, but some data may be encrypted for transmission to a particular individual using that individual's public key, so it can only be decrypted using the matching private key.

The obvious solution is to establish the data in the required format before encrypting it for transmission. Thus a distinction must be made between encrypting for local storage, and encrypting for secure transmission.

Digital Signatures—A key component of a digital signature algorithm is its ability to ensure the integrity of the signed data. As described above, this is achieved by creating a digest of the actual data being signed.

Almost every application of digital signatures will digest the data in the same format that it is stored. That is, the data that is digested will be in a form that is proprietary to the application that created it. This creates a problem in exchanging the data with another application, since the data will surely have to be translated to some standard format that is understood by both parties (applications).

One solution to this problem is to agree to a standard format for the data, and to always digest the data in that standard format. Thus, when creating or verifying a signature, the application will have to translate the data to an agreed upon standard, and then digest the data in its standard form.

This solution is weakened by the fact that no agreed upon standard can represent the data with the full richness of every possible application using the standard. Some data will inevitably be lost in the translation, which reduces our confidence that the signature truly represents the data. The reduction of the data allows some forms of tampering to go unnoticed, and the precise extent of possible tampering will be difficult to define.

Another possible solution is to discard the original signature, and instead validate the translated data with a new signature. In this approach, as data is translated to an interchange format, the signatures in the original data set would be verified using the original binary representations of the data. Once verified, the identity of each signer would be incorporated into the translated data as simple text values. A new signature would be applied to the entire translated data set, which vouches for the fact that each signature in the original data set was successfully verified by the individual signing the new data set. This interchange data could then be verified by the receiving individual, and a similar process applied to voice for the integrity of the data after it is translated to the new native format.

This approach uses a succession of verifications and subsequent guarantees, applied by different individuals, to preserve the trust in the identity of the original signers. Although it is less direct, and the original signatures are lost, it is possible to follow the process backwards and understand that at each point, the data's integrity was intact, and to obtain the identity of each individual involved in the process.

The Problems

A burning issue in the area of securing form data is the authentication of a form's layout. The layout of a form defines how the data is represented to the user, and can include many graphical elements as well as fields, tables, and so on. The basic problem with authenticating form layouts is that they change on a regular basis, as forms are revised.

To fully authenticate a set of form data, one must also include information about how that data was (and is) represented to the user. Without knowing how the data was represented, it is impossible to know exactly what the signing individual thought he or she was signing, and there are many possibilities for fraud.

For example, with access to the design tools, a malicious user could modify the layout of a form to change authorized text or to obscure data with graphical elements, or misrepresent the data in other ways. Signatures obtained with a falsified representation of the data could then be verified with the data in its originally intended representation. Therefore, without ensuring the integrity of the layout, nobody can truly trust in what is seen on the screen, or feel comfortable signing a form document.

Thus in the prior art, when a form layout changes, the old data must be retrieved, associated with a new form, and then the new form with the old data signed and stored. This is required even when the changes to the form layout are minor and insignificant in terms of the semantics of the information contained within the form.

When such a process is followed, there is no guarantee that the new layout doesn't change the semantics of the information. For example, a field labeled date_account_ opened with an entry of Jun. 25, 1885 can be changed by changing the label of the field to date_of_birth and the semantics of "Jun. 25, 1985" will completely change. There is thus a problem of maintaining consistent semantics when changing the layout of data in a form. The prior art does not handle well the exchange of foreign data across platforms and across different applications, especially different applications from different vendors. Further, the prior art does not readily incorporate a form layout which includes graphical elements.

Disclosure of the Invention

The invention overcomes the problems of the prior art by providing methods, apparatus, systems and computer program products for the secure handling of forms and form data.

In general, this is accomplished by separating the data from the form layout and by separately signing the data and form layout. The layout and the data are related in such a way so that if the layout changes, the data file can be applied to a revised layout in a way which guarantees consistent semantics with that which previously existed.

The invention is directed to a method of storing forms by storing at least one form layout, and separately storing form data containing a reference to the form layout. The layout and the form data are preferably signed using encryption of a digest. Signatures to the layout and form data are validated using a public key infrastructure which may or may not be controlled by a trusted third party. The form layout and the form data are linked by a common schema which links field or cell names and data values. One form layout can be replaced by a different form layout, such as a later revision, based on the common schema.

The invention is also directed to a method of retrieving form data by retrieving a form layout, retrieving form data which contains a reference to a version of the form layout, and associating values of data elements of the form data with corresponding data elements of the version of the form layout. Retrieved form data can be edited and the edited values of data elements stored in revised form data. The revised form data together with a reference to a version of the form layout is signed.

The invention is also directed to apparatus for processing form data, including a processor and data storage connected to the processor. The data storage stores at least one form layout and data for filling in at least one instance of the form layout. The processor is configured to verify the authenticity of a signature to one of the form layout and the data before permitting the use of the data with the form layout.

The invention is also directed to a system for processing form data including a server having a database storing at least one form layout and separately storing at least one record containing form data for filling in at least one instance of a form layout, a client process running on a computer, and a network connecting the computer to the server. The client process is configured to request a copy of a record to be associated with a copy of at least one form layout. The client process is configured to verify the authenticity of a signature to one of the form layout and the data. This can be done using the services of a trusted third party.

The invention is also directed to a computer program product, including a storage medium, and a computer program stored on the storage medium for processing form data stored on the medium comprising at least one of a form layout and form data. The form layout comprises (1) layout information, (2) a form number and revision, (3) a layout originator's signature to the form number and revision. The form data comprises (1) data information, (2) a form number and revision, (3) a layout originator's signature to the form number and revision.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIG. 5 is an example of program-like statements used to display or paint the screen layout of FIG. 4.

NOTATIONS AND NOMENCLATURE

Figure 1:
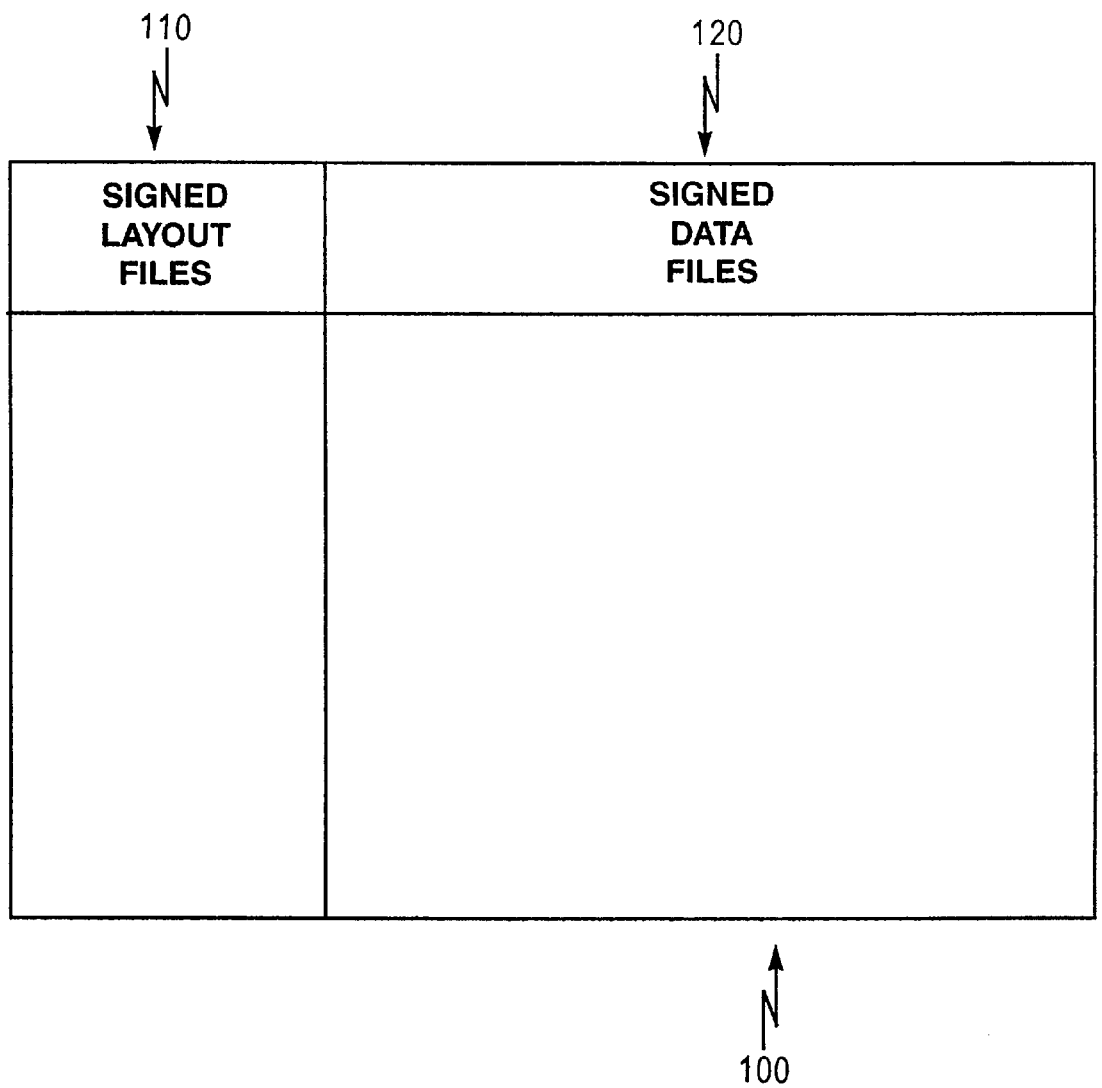
FIG. 1 is an illustration of an exemplary organization of signed layout files and signed data files for storage in accordance with the invention.

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DETAILED DESCRIPTION OF THE INVENTION

The approach to overcoming the problems referred to above is to focus on creating an unbreakable chain of trust in the following statements about a particular signature:

the identity of the signer is valid the data has not been tampered with the data's representation was valid when this signature was created the data's representation is currently valid, and carries the same meaning as was originally intended The first two statements are integral to any digital signature strategy. The last two statements are unique to the inventive strategy in that focus is on the meaning of the data, not on the exact pixels that are displayed on the screen.

The implications of this are that one does not have to ensure the integrity of every byte in the data and layout in one big lump, but can instead focus on validating each piece of the puzzle separately and then connecting them together. The inventive approach considers the integrity of the data and its on-screen representation separately, and then connects them to each other and to the responsible individuals using the same reliable cryptographic techniques. This creates a secure network of authority and trust, as each participating piece of information is signed by the responsible individual, and all of the parts are securely interconnected.

Thus, the data that is entered when the form is filled is signed directly by the individual that entered it, whereas the form layouts or designs that participate in the presentation of that data are signed (and therefore approved) by a responsible individual in the company's administration.

In addition to signing each piece of information that participated in the representation of the form data, the signatures also cross-sign one another where appropriate, to ensure the integrity of the entire network of signatures. The layout is signed (or authorized) by a responsible individual when the layout is designed, and that signature is stored in the layout. When some form data is signed, the layout signature is then incorporated into the data signature.

Consider an example where a layout is signed, and some data is created using that layout. Later, a revision of the layout is made, and also signed, and then this new layout is used to view the original data and certify its signatures.

When the original layout is created, it is given a unique form ID and revision number. When the layout is finished and ready for distribution, it is signed by the person responsible for the design. This creates two signatures: one that includes everything about the layout file (i.e. every byte of relevant data in the file), and another that just includes the form ID and revision number. The purpose of the first signature is to ensure the integrity of the layout file, and is called, for convenience, the layout signature. The purpose of the second signature is to build the network of authorizations with the data, so let's call it the authorizing signature.

Now, a user wishes to fill some data, and so creates a data file using the layout from above. At this point, the user can verify the layout if he/she wishes. This will actually verify the complete layout signature. By verifying this signature, the user is guaranteed that the layout is identical in every important way to the one that was authorized by the form's designer, and the identity of the designer is found.

Once the data has been filled in, the user can save the data in a file. This file contains the form ID of the layout needed to display the data. When the user signs the data, every piece of information relevant to the actual data is included in the signature, as well as the form ID and revision of the layout, and the actual bits in the authorizing signature. The form ID, revision number, and authorizing signature are also stored with the data signature.

At this point, the data has been signed, and the user knows that the layout used to represent the data is valid, because it was authorized by the person who designed the form, and the layout signature was verified correctly.

When the layout is revised, it is then authorized again by the form designer. This new revision is then placed in distribution, and propagates out to all users. Now the user opens his/her data, and wishes to verify the data's integrity.

The new layout can easily be verified, since it will contain the new layout signature that includes every bit of relevant data in the layout. This signature is different from the layout signature in the earlier revision, and may even name a different individual, but the process is the same. The new layout is just as valid as the original, and by signing the layout, the designer of the form is guaranteeing that this layout will provide a valid representation of any new or existing form data.

The data signature can be verified, since the data will not have changed. All of the ancillary pieces of information that were signed with the data (form ID, revision number, and authorizing signature) are also stored with the data signature, so the only external information needed to verify the data signature is the data itself. Once the data signature verifies, we have the following pieces of information:

a guarantee of the data's integrity the identity of the signer the form ID and revision number of the original layout in use at the time the signature was created the authorizing signature from the original layout.

The first two items cover the conventional approach to signing data, without consideration of the data's representation. By comparing the form ID in the data signature to the form ID of the current layout, we are assured continuity in the data's representation. The revision number can be used to go back and find the exact layout used to create this signature if that is necessary. Finally, the authorizing signature itself is included in the data, because we can now verify that signature to find the identity of the designer of the original layout.

Now that we have an example to provide some context for all of these little signatures and so on, let's try summarizing the process and what we know at each stage.

Sign the Layout—The designer of the form signs the layout before distributing it to the users. This creates two signatures: a layout signature, and an authorizing signature. The layout signature guarantees the integrity of that revision of the layout by signing every bit of information in the layout. The authorizing signature provides long term identity of the form designer by digesting just the form ID and revision number, which are stored in clear text with the two signatures.

Verify the Layout—A filler user can verify the layout signature for the current layout, at any time. This insures the integrity of the current layout file, and also identifies the form designer. This verification can be performed automatically before allowing data to be created or signed, and when any data signature is verified.

Sign the Data—A filler user can sign the data that has been filled out and saved in a data document. The data signature provides guaranteed integrity of the data itself by digesting every relevant piece of information in the data record. The data signature also provides a guarantee of the form's representation by digesting the form ID, revision number, and authorizing signature of the current layout.

Verify the Data—A filler user can verify a data signature. This ensures the integrity of the data, and identifies the individual that signed the data. This also guarantees the form ID, revision number, and authorizing signature of the layout that was in use when the data signature was created. The form ID and revision number can be compared to the current layout to ensure continuity in the representation of the data.

The authorizing signature can be verified separately, to identify the individual responsible for the original layout.

This process, taken as a whole, guarantees the integrity of each piece of information that participates in the representation of the data both when the data is signed, and then later when the data is verified. The unique value of this solution is that the layout used to display the data file can be revised between the time when the data is signed and when it is verified. Revisions to the layout do not affect the integrity of the data signature, yet at the same time the validity of the layout throughout the entire process is guaranteed, and we are further guaranteed that the current representation of the data carries the same meaning as it did when the data was originally signed.

As with most applications of digital signatures, there is significant attention given to reassuring the user that the system is secure. However, the most important aspect of this solution is that it provides an unbreakable audit trail that can be followed in any investigation of suspected abuse.

FIG. 1 is an illustration of an exemplary organization of signed layout files and signed data files for storage in accordance with the invention. As shown in FIG. 1, element 100 represents storage such as might be organized in a data base. Storage consists of two sections. First, a section for storing signed layout files 110 and second, a section for storing signed data files 120. Signed layout files and signed data files are shown respectively in FIGS. 2 and 3.

Figure 2:
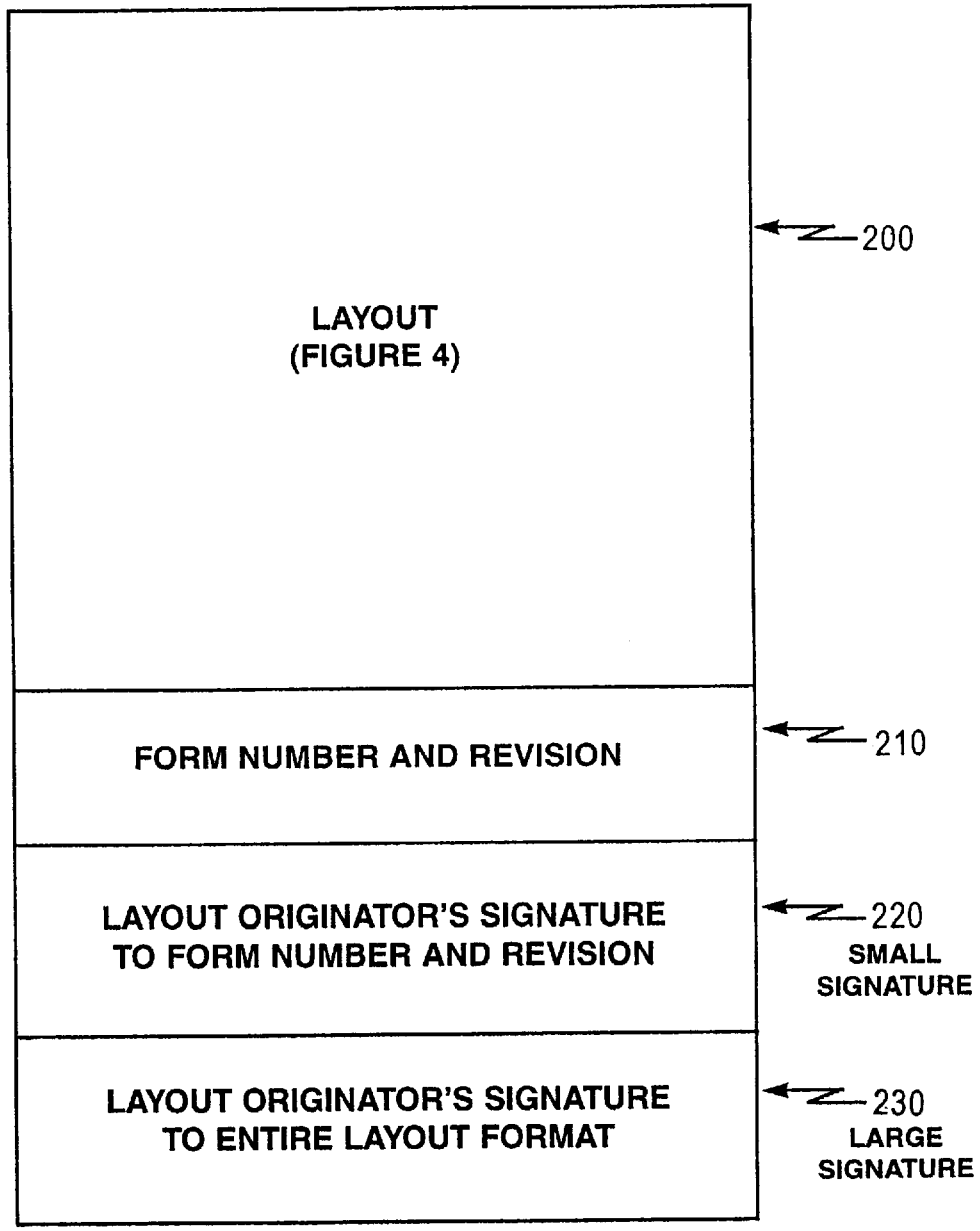
FIG. 2 is an illustration of an exemplary signed form layout format in accordance with the invention.

FIG. 2 is an illustration of an exemplary signed form layout format in accordance with the invention. The signed layout format includes a layout 200, such as shown in FIG. 4, a form number and revision 210, a small signature 220, consisting of the layout originator's signature to the form number and revision of the layout, and a large signature 230 which is the layout originator's signature to the entire layout format.

Figure 3:
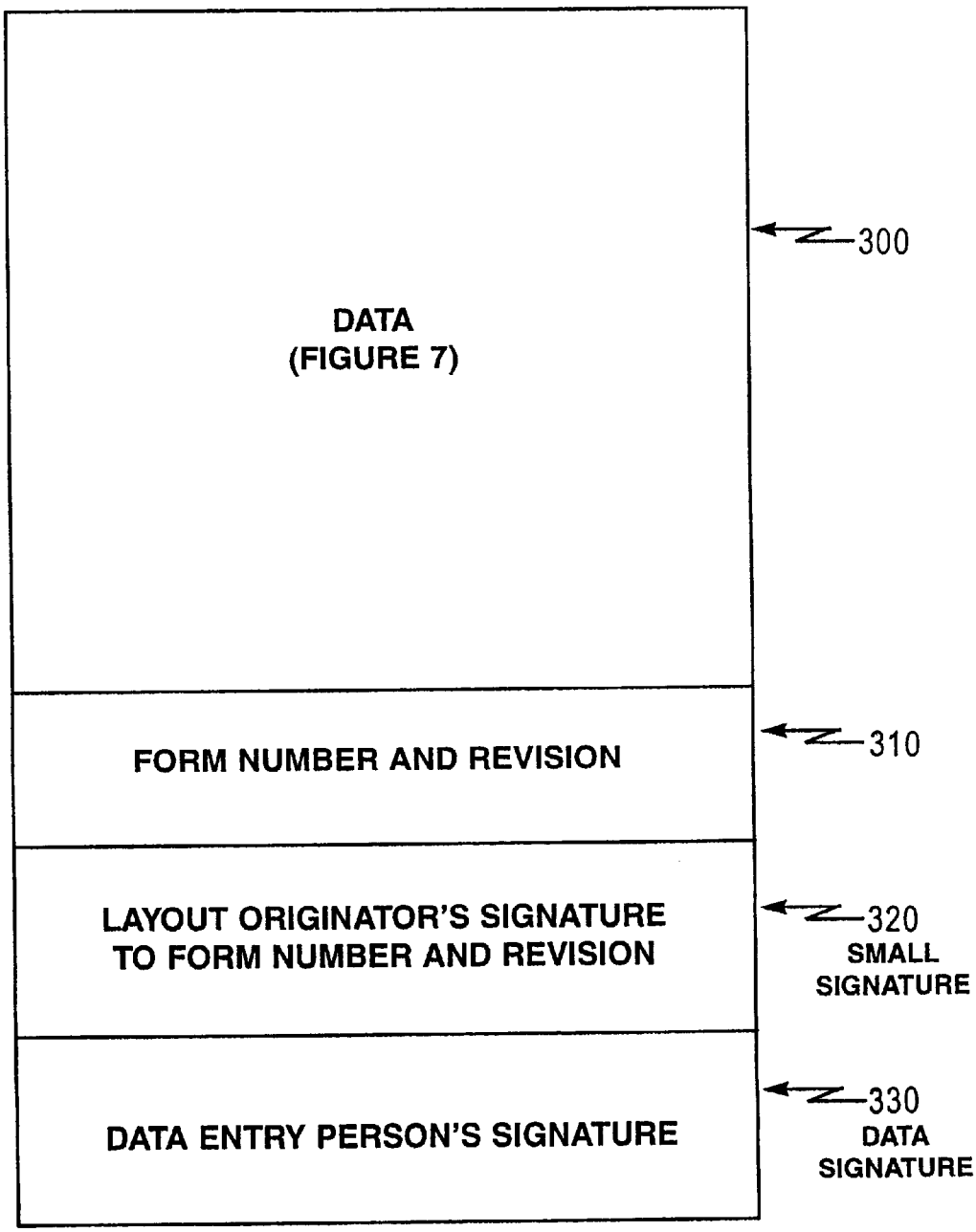
FIG. 3 is an illustration of an exemplary signed data format in accordance with the invention.

FIG. 3 is an illustration of an exemplary signed data format in accordance with the invention. The signed data format of FIG. 3 includes a data section 300, such as that shown in FIG. 7, a form number and revision 310, the layout originator's signature to the form number and revision (the small signature) 320 and the data entry person's signature to the signature 330. Signature 330 signs a digest of the data (300), form number and revision (310), and the layout originator's signature.

Figure 4:
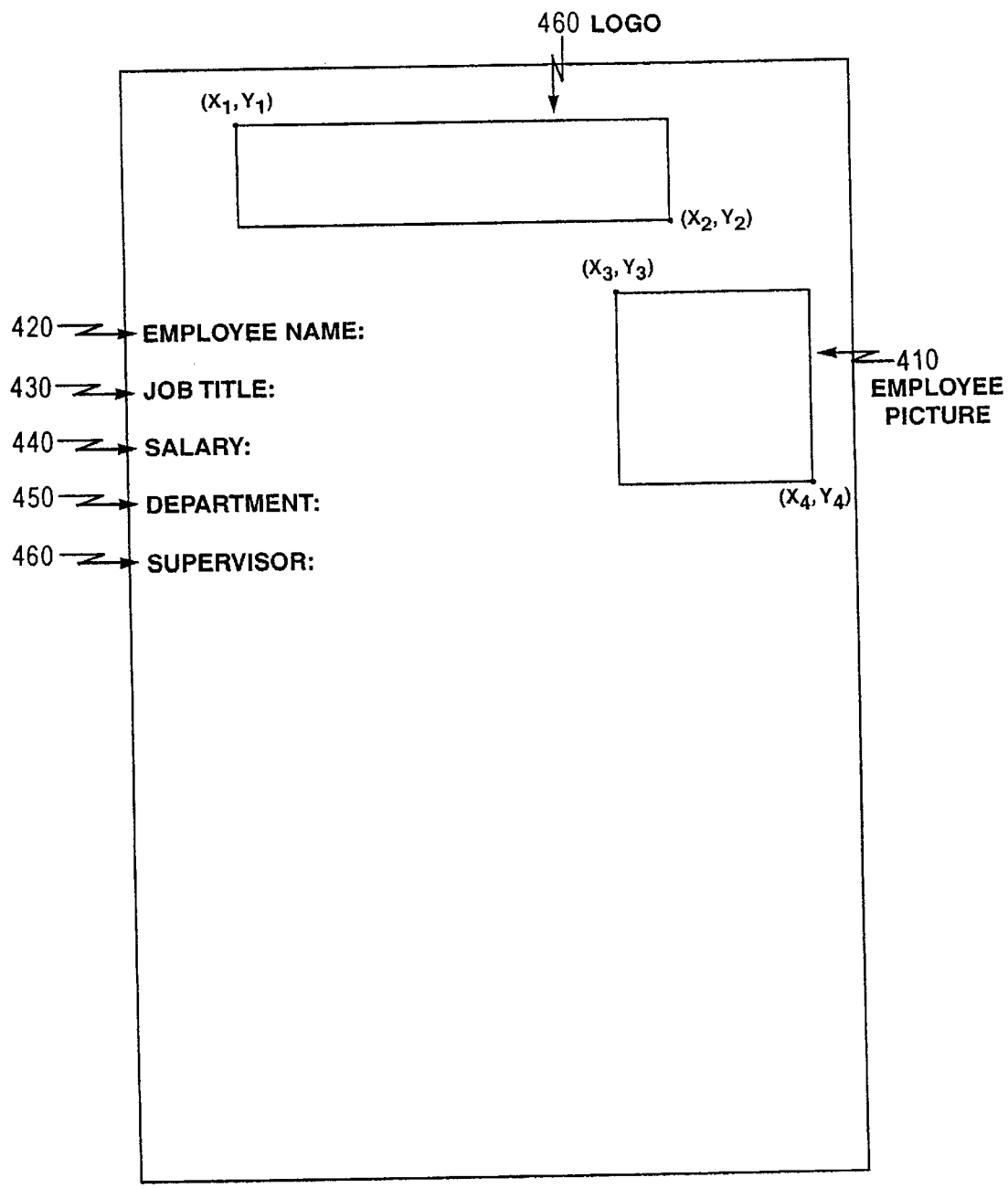
FIG. 4 is an exemplary form layout at the revision level used in the signed form layout of FIG. 2.

FIG. 4 is an exemplary form layout at the revision 2 level used in the signed form layout of FIG. 2. Specifically, FIG. 4 illustrates a "form 756, employee record layout, revision 2" form such as might be utilized for an organization. The form includes a logo 400 which, in the example shown, is a bit map extending in the rectangle encompassed by corner points $(X_1,Y_1)$ and $(X_2,Y_2)$ The form also includes an employee picture 410 which is similarly a bit map image positioned in the square defined by corner points $(X_3,Y_3)$ and $(X_4,Y_4,)$. A plurality of data fields are associated with the form. Each data field is associated with a field label which, in the example shown, includes employee name 420, job title 430, salary 440, department 450 and supervisor 460. Other fields would typically be shown in a employee record layout as needed by the specific organization. The fields illustrated in FIG. 4 are selected for convenience in illustrating the invention and do not represent mandatory field names required for an employee record. They are, rather, exemplary of the kinds of information that might be stored in a record form.

FIG. 5 is an example of program-like statements used to display or print the screen layout of FIG. 4. FIG. 5 illustrates a display screen procedure. First, a variety of local variables are defined which correspond to names for the data elements to be stored. Then, in the example shown, Window 1 is opened and a call to a subroutine logofile is initiated. The logofile procedure is a data rich procedure defined at the bottom of the program statements shown in FIG. 5 which includes a display statement and a variety of data elements for display in pixel locations within the pixel Window 1.

After the logo file has been displayed, a second window is opened where the bits of an employee picture array are displayed. Details of the employee picture array are not shown in FIG. 5, but the array can be handled in the same manner as the logo file information. The cursor is then moved to a location LOC1 where the label "EMPLOYEE NAME: " is displayed followed by the value for the variable employee_name. After two line returns, the label "JOB TITLE: " is displayed followed by the value for the variable job_title. This sequential display of labels and associated variables then continues through the end of the display screen procedure.

Figure 6:
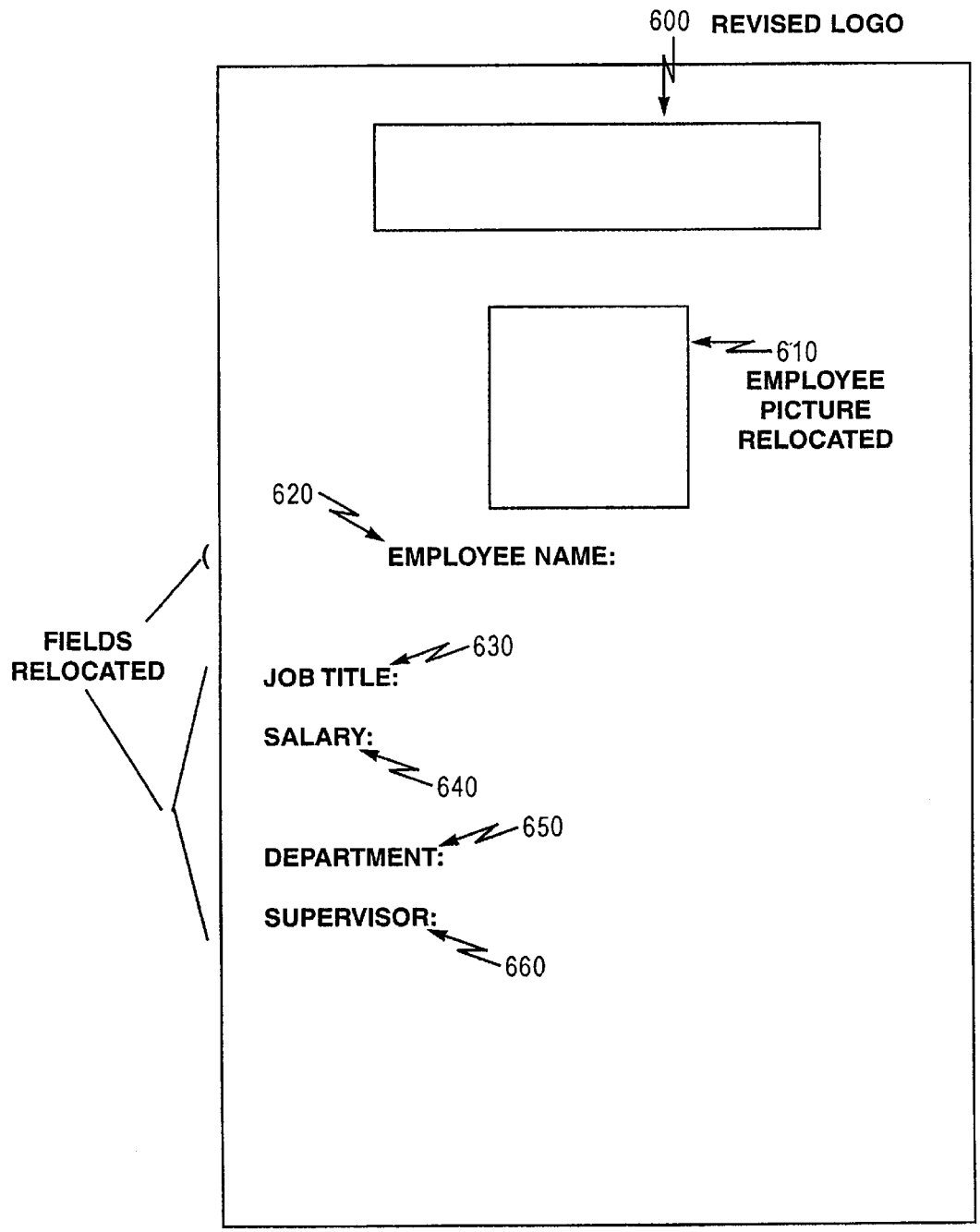
FIG. 6 is a revision 3 level version of the form layout shown in FIG. 4.

FIG. 6 is a revision 3 level version of the form layout shown in FIG. 4. In this version of the layout, the logo 600 has been revised to display a different information and the location of the employee picture 610 has been relocated to the center of the display. The employee name 620 has been repositioned so that it is directly underneath the picture and the fields 630, 640, 650 and 660 are relocated so that their associated labels are shown as illustrated in FIG. 6.

Clearly, this organization of information on the screen requires changes to the programming statements which define the screen layout. Nevertheless, the field or cell names, such as EMPLOYEE NAME, JOB TITLE, SALARY and the like have not changed nor have the variables associated with those labels. Thus, the employee unique data has not changed and, therefore, it is desirable that no change need be made to the signed data information previously captured. However, the layout for the screen has changed in that a new logo is displayed and the position of the various elements of the layout have been relocated.

Figure 7:
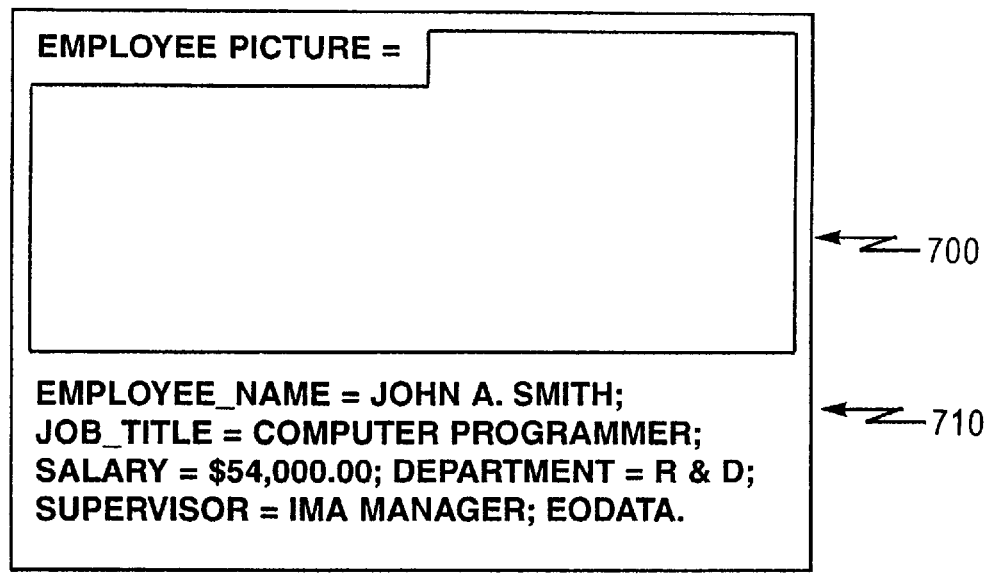
FIG. 7 is an exemplary data layout used in the signed data format of FIG. 3.

FIG. 7 is an exemplary data layout used in the signed data format of FIG. 3. In the example shown in FIG. 7, the employee picture array is shown stored at 700. The field or cell names are associated with specific variable values in region 710 of the data layout. The relationship between the field or cell names and the associated variables are important because the field or cell names reflect the same names utilized in the form layout so that the values associated with the field names in region 710 can be mapped to the proper location on the screen with the assurance that the semantics for the values will not have changed. Thus, block 710 represents to some extent a schema relating data element names to data values and that schema is consistently employed in the form layout. As shown in FIG. 3, the form number and revision level are also stored as part of the data file at 310. The originator's small signature is stored at 320. The entire data set beginning with the employee picture label and including fields 700, 710, 310 and 320 are then signed by the data entry person and the signature appended to the record file at 340. An end of file indicator EOF may optionally be used to indicate the end of the data layout.

Figure 8:
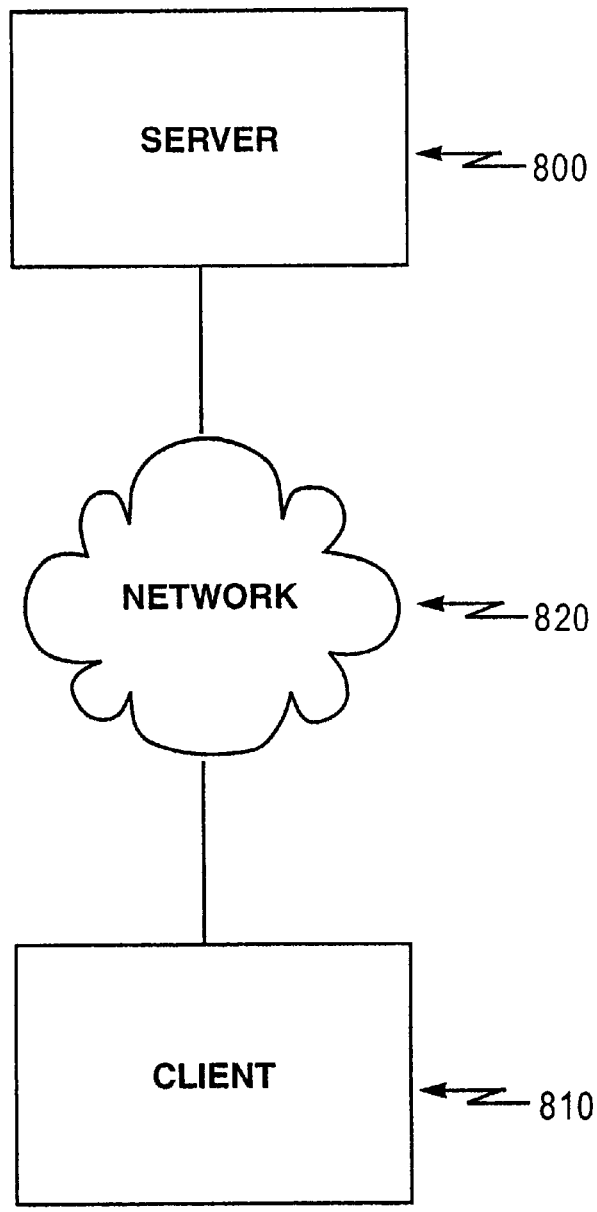
FIG. 8 illustrates use of the invention in a client server environment.

FIG. 8 illustrates use of the invention in a client server environment. A client 810, running the form software is connected over a network 820 to a server which can provide information stored in a manner previously described.

Figure 9:
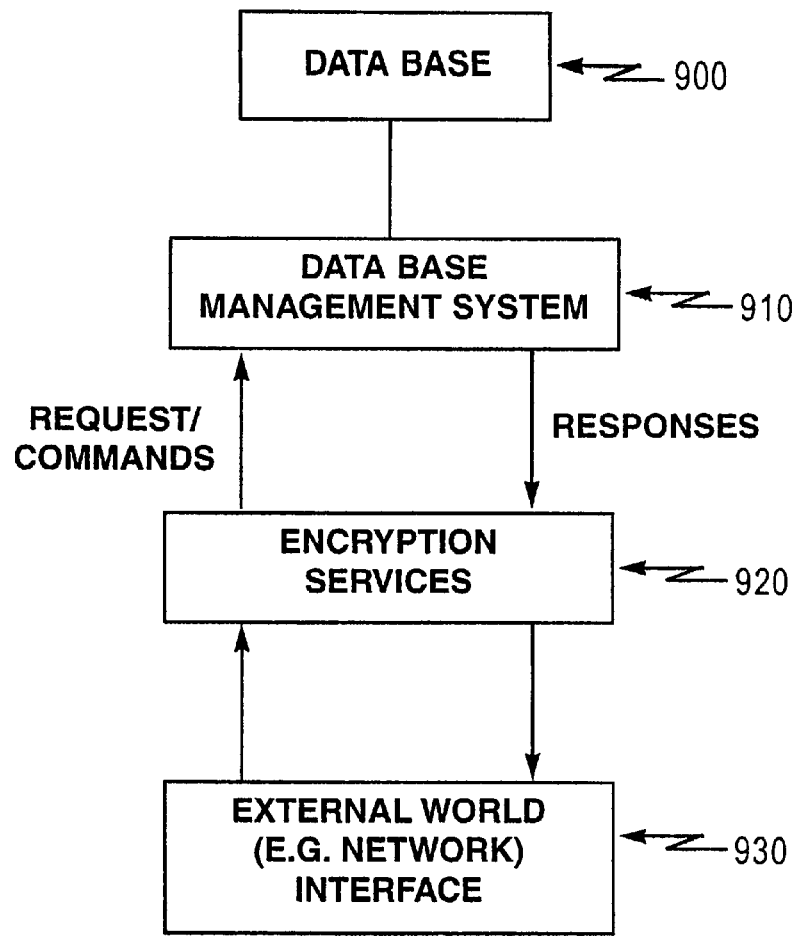
FIG. 9 illustrates organization of a server in accordance with the invention.

FIG. 9 illustrates organization of a server in accordance with the invention. As shown in FIG. 9, a data base 900 is accessed through data base management software 910 and encryption services 920. An external world (e.g. network)

interface 930 serves as a network access point for receiving requests and commands and providing responses to clients. The request might be for stored signed form layouts or for stored signed data formats.

Figure 10:
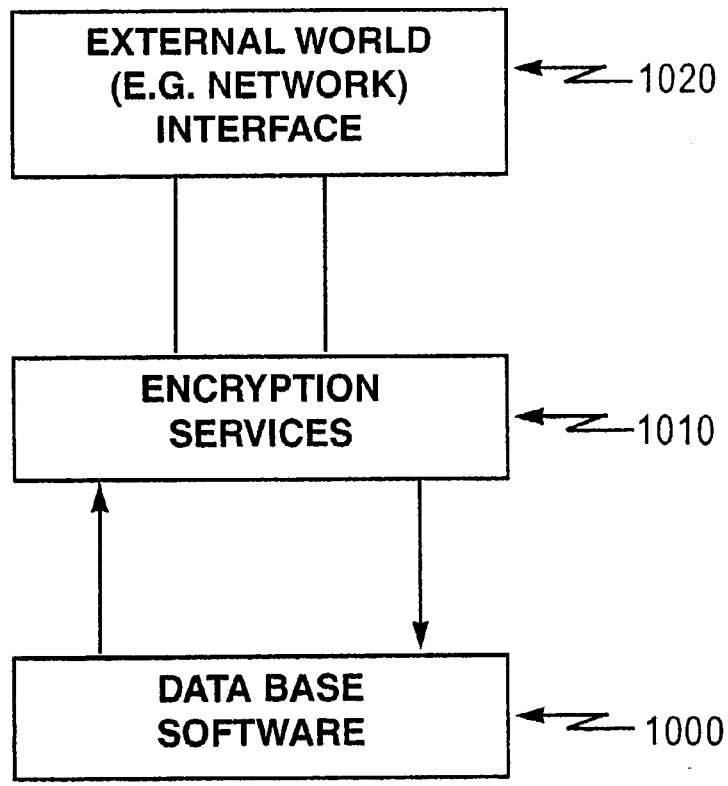
FIG. 10 illustrates organization of a client in accordance with the invention.

FIG. 10 illustrates organization of a client in accordance with the invention. The client runs data base software 1000 which permits the retrieval of form layouts and signed data formats. Encryption services 1010 permit determination that signatures to the form layouts and data are authentic and external world (e.g. network) interface 1020 permits access to the network.

Figure 11:
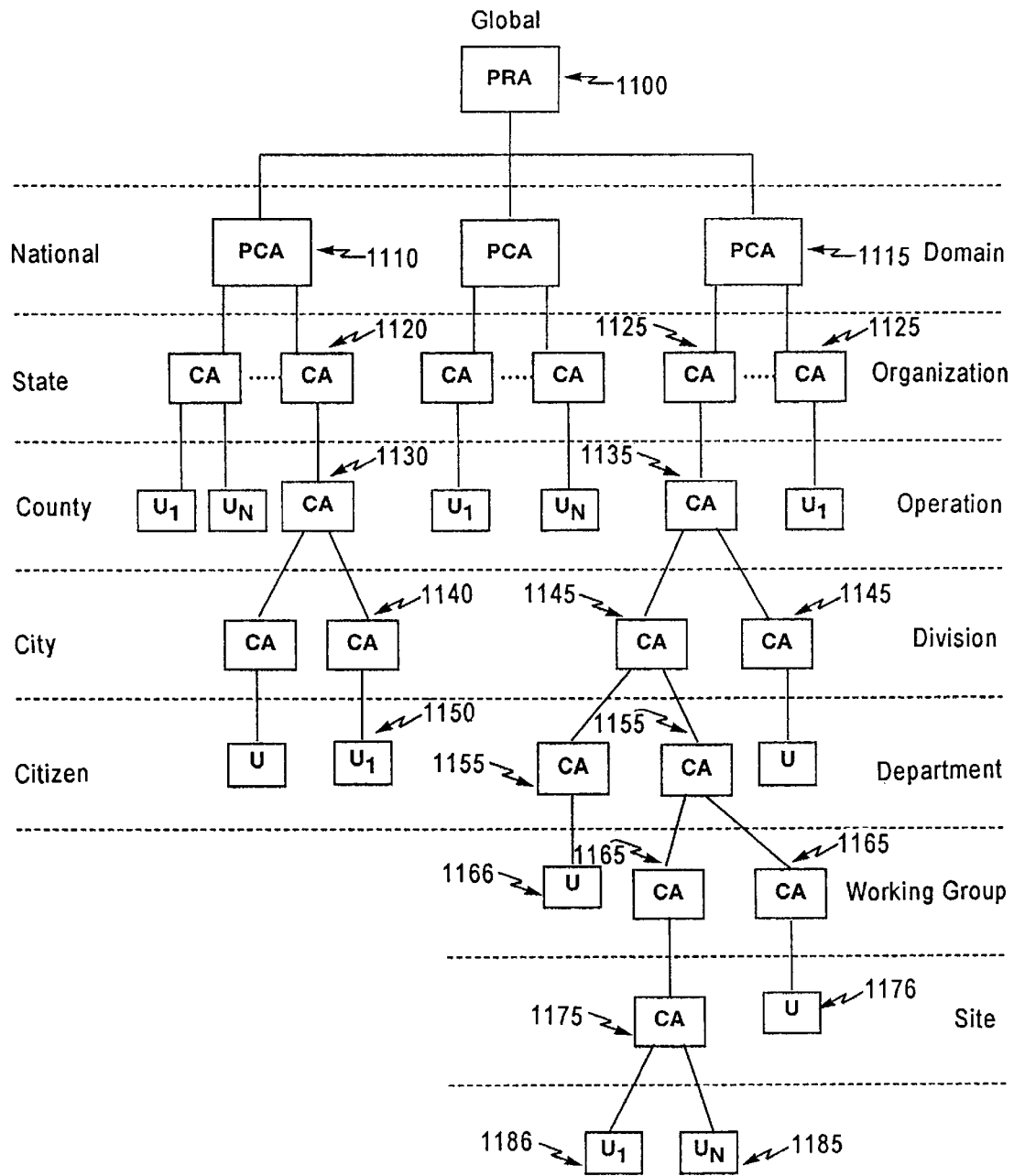
FIG. 11 illustrates an exemplary public key certification hierarchy.

FIG. 11 illustrates an exemplary public key certification hierarchy. FIG. 11 is a logical representation of a hierarchical security or public key infrastructure in accordance with the invention. Each block illustrated in FIG. 11 represents a computer which either uses or performs a function within the public key or process infrastructure, or both. Although in actuality, each of the blocks in FIG. 11 is connected to a communications network so that each computer system may exchange information with any other, a hierarchical arrangement is shown with the various levels representing where a particular computer is positioned in the certification hierarchy. At the highest level, the root of the hierarchy, sits a Policy Registration Authority (PRA) with global jurisdiction. This PRA is like that envisioned for an Internet policy registration authority in RFC 1422. Beneath the policy registration authority are Policy Certification Authorities (PCA), each of which defines a particular set of certification policies which differ from PCA to PCA. Policy certification authorities set the standards for their particular domains. A policy certification authority could, for example, be a standards body of a particular national government. Alternatively, a policy certification authority might be the chief information officer of a multinational corporation. What is important is that organizational entities operating under a substantively different set of policies should interface through their policy certification authority computer. Below the policy certification authorities are certification authorities such as 1120, all of which follow the policies set by PCA 1110 Certification authorities can then certify sub-certification authorities in a hierarchical fashion until ultimately the end users are certified at the bottom of the hierarchy.

In FIG. 11, policy certification authority 1110 may be established as a national certification authority, say, for example, for the USA. Underneath the policy certification authority are certification authorities 1120 which could, pursuing the hypothetical, be established for each state in the United States. Beneath that could be certification authorities 1130 for county governments, and under that certification authority for cities at 1140 and ultimately down to the user level at 1150. The particular division and assignment of certification authorities are established by the policies established by the PCA. Policy certification authority 1115 might service a number of corporations each having their own certification authorities 1125. Company wide CA 1125 might then certify a number of operations such as 1135 within the company. Each operation might then certify its divisions 1145 and the divisions might certify departments 1155 and the departments might certify working groups 1165 and user's 1166. The working groups might then certify site 1175 and user 1176 and the site might certify, ultimately, end users 1186.

Secure electronic documents and the handling of public keys in an open network, such as Internet, are based on some type of certificate. A certificate is specially constructed data structure which contains the user's public key. Further, a certificate contains unique identification of the public key owner and some additional parameters related to the validity of the certificate. In order to guarantee the integrity, authorization and originality of certificate data, each certificate must be issued by an authority, in this context, called a Certification Authority (CA) The Certification Authority vouches for the identity of the public key owner, for the integrity of the public key itself, for the binding between the public key and the owner's identity, and optionally for some additional capabilities of the certificate owner in the electronic environment. This guarantee is reflected in the certificate through the identity of the authority, together with the authority's digital signature to the certificate. Certificates may further may contain references to the types and purposes of public keys, to the relevant certification policies and eventually to the authorization privileges of certificate owners. Certificates may contain other parameters relevant for the purposes and usages of certificates and public keys.

Figure 12:
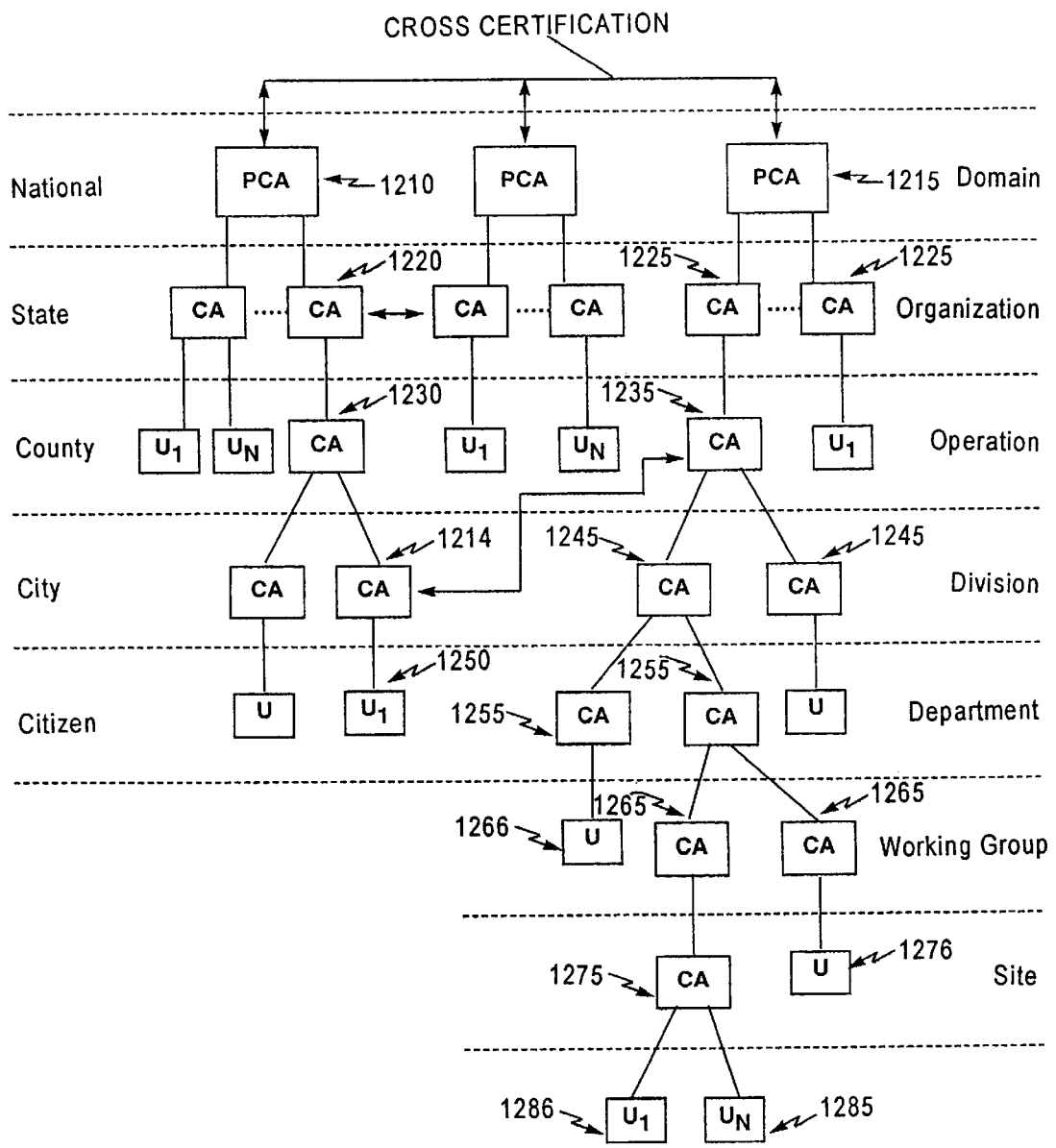
FIG. 12 illustrates a cross certification approach to public key certification.

In FIG. 12, a cross-certification alternative to a strictly hierarchical arrangement is illustrated.

Figure 13:
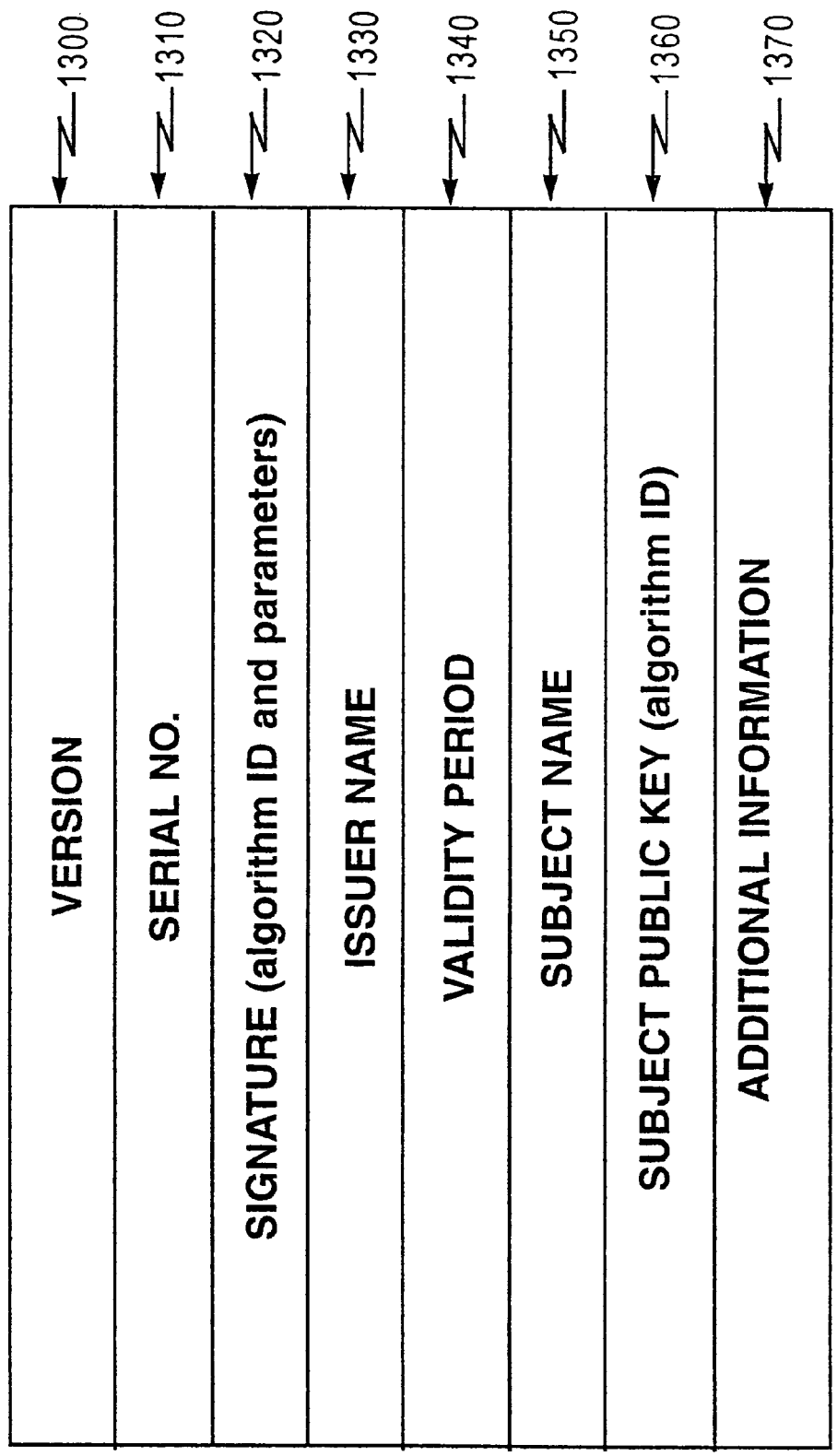
FIG. 13 illustrates an exemplary public key certificate.

A certificate is a data structure. A sample of such a data structure is represented in FIG. 13. The version number of the certificate, shown at item 1300, is intended to facilitate orderly changes in certificate formats over time. Typically, version numbers may be those utilized in the X.509 recommendation by default.

Serial Number 1310, is a short form, unique identifier for each certification generated by an issuer. A serial number is unique only to an issuer. That is, an issuer will not issue two certificates with the same serial number. The serial number is used in certificate revocation lists (CRL's) to identify revoked certificates.

Item 1320 represents the electronic signature of the issuer together with the algorithm and parameters utilized to sign the certificate.

Item 1330 represents the issuer's name which is a representation of the issuer's identity, preferably in the format of a distinguished name as set forth in the X.500 directory system.

The validity period is a pair of date and time indications indicating the start and end of the time period over which a certificate is valid.

The subject name, shown at item 1350, is also a distinguished name such as that utilized in an X.500 directory system.

Item 1360 shows the public key of the subject which is being certified by the certifying authority.

Finally, item 1370 contains additional information which is optional which might be useful to the purposes discussed above.

The registration process for a station which desires to participate in the security or public key infrastructure begins with an application which provides the various kinds of information required by the policy certifying authority. The information on the application is verified either automatically or manually, depending on the policy, and if the application meets acceptance criteria, the certification process may begin.

Once a user station is in possession of a signed certificate from a certifying authority, the user is prepared to engage in secured transactions as described hereinafter.

Figure 14:
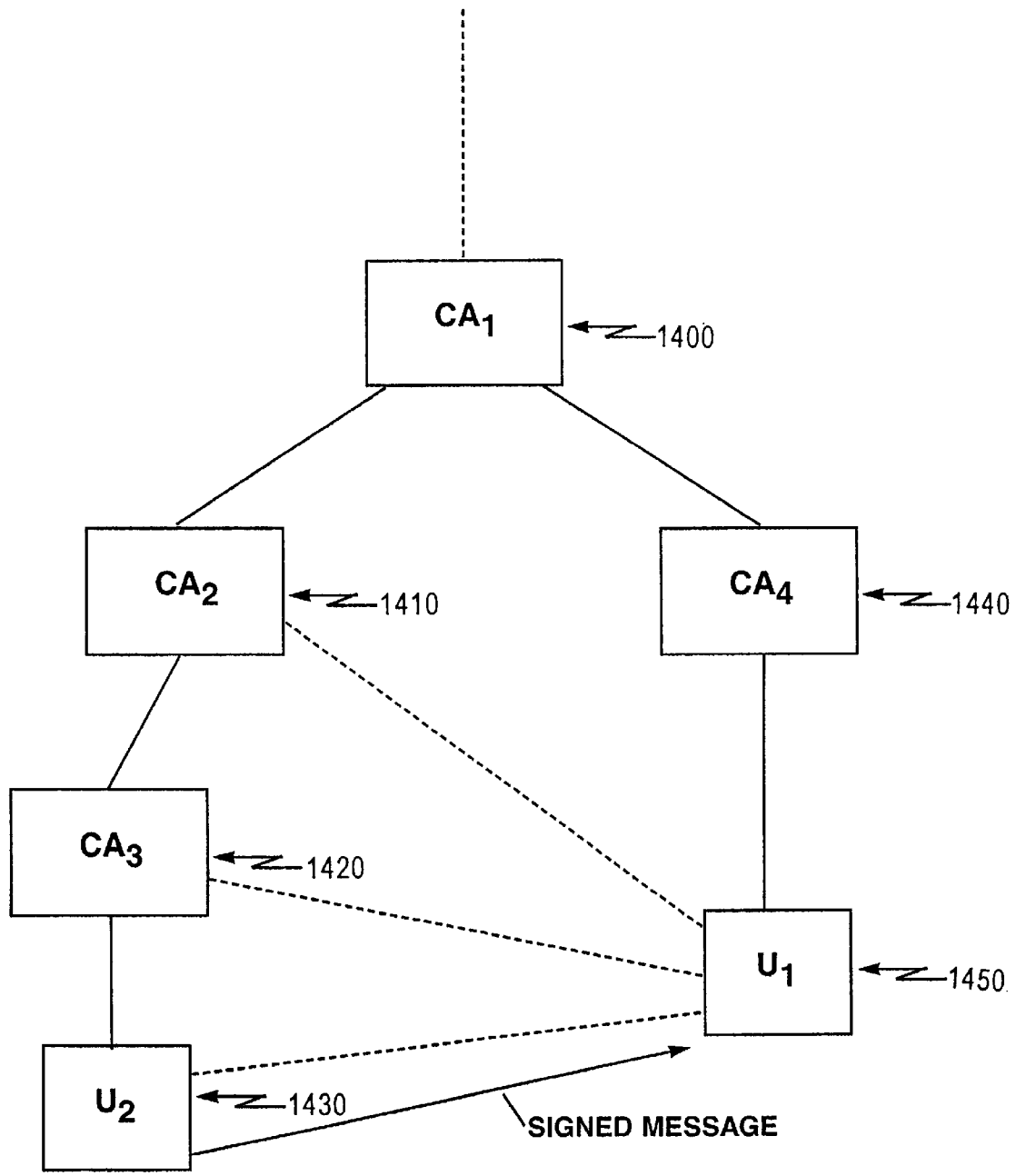
FIG. 14 illustrates validation of signatures using a public key hierarchy.

FIG. 14 illustrates how a public key infrastructure can be utilized in accordance with the invention to verify transactions. In this example, assume that user U2 (1430) sends a signed message to user U1 (1450). It is convenient and preferred for each user, such as U1, to have certificates stored in their certificate storage data base 1230, for themselves and for each station between the user U1, and the policy registration authority.

Although station U2 could have sent a certificate with a signed message, for this example, we will assume that U2 did not include a certificate. Thus, for station U1 to have confidence that the signed message originated with U2, the signature must be verified. To do this, station U1 sends a Get_Certificate message to station U2 and to certifying authorities CA2 and CA3. Since CA1 is in the direct chain of hierarchy between U1 and the PRA, the certificate storage data base of station U1 presumably contains a certificate for CA1. Station U1 sends a Certificate_Request Message to stations U2, CA2 and CA3. When station U1 receives Certificate_Reply messages from these stations, their certificates are extracted and stored in the certificate storage data base. They are then utilized as follows:

Since the certificate received from station CA2 is signed by CA1 and since U1 already has a certificate of CA1 in the certificate storage data base, CA2's certificate can be authenticated by using the locally stored version of CA1's public key to decrypt. If it decrypt's properly, then CA2's is known valid. Since CA3 was certified by CA2 and since U1 now has a valid certificate for CA2 which it placed in storage when received, one can verify the certificate of CA3 by utilizing the public key for CA2 to decrypt the signature to CA3. If it decrypts properly, then the certificate for CA3 is known to be valid and one can utilize the public key contained therein to verify the certificate of station U2 by decrypting U2's certificate with the public key contained in CA3's certificate. Thus, having a known valid certificate for U2, one may decrypt the signed message using the public key of U2's certificate and have considerable confidence that the message is authentic and that no public keys have been tampered with. Station CA1 represents the "common point of trust" in the hierarchy in that it is the lowest point in the hierarchy which is common to both the sending and receiving stations.

Figure 15:
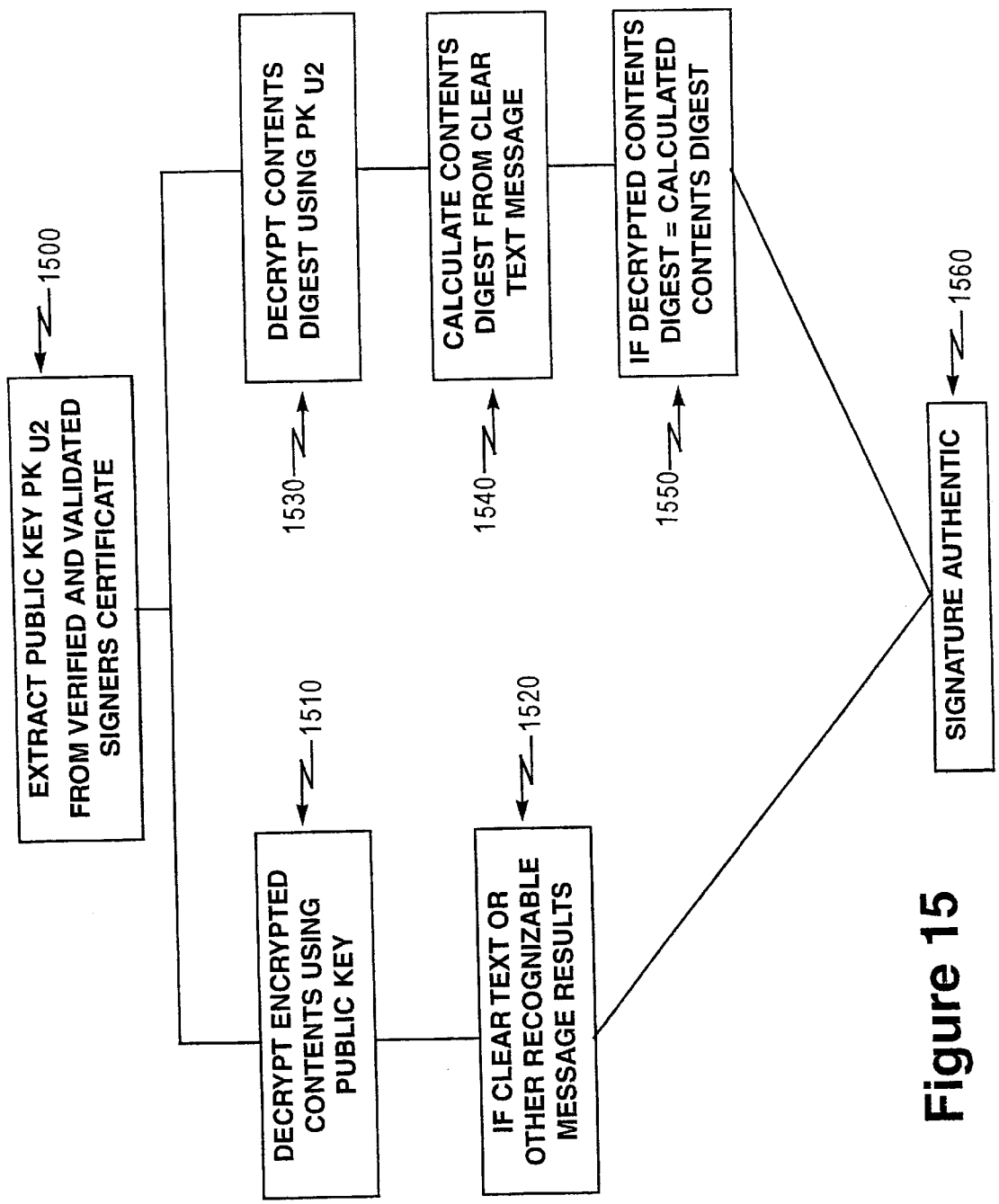
FIG. 15 is a flow chart of a process for validating a signature using a signer's public key.

FIG. 15 illustrates the process by which a signature may be verified.

Once one has determined that he has a valid public key for user U2 from the verified and validated certificates, there are two ways ensuring that the signature is authentic. These two ways relate to how the signature was generated. As discussed above, in one signature mode, the entire document is encrypted with the secret key of the sender. Thus, if one decrypts the encrypted contents using a public key (1510) if clear text results (1520), the signature is authentic (1560). On the other hand, in a second signature mode a contents digest is utilized to sign the document. One would decrypt the encrypted contents digest using $PK_{U2}$ (1530), calculate the contents of the digest independently using the clear text contents (1540) and if the decrypted contents digest is identical with the calculated contents digest (1530), the signature is authentic (1560).

There are two primary reasons for revocation of a certificate. The first is a compromiser suspected compromise of a private key. The second is a change of user or CA affiliation.

As discussed above, to validate a certificate reliably, the validator must ensure that none of the certificates utilized in validation has been revoked. To ensure that, the validator must have a correct certification revocation list from the common point of trust to the entity whose certificate is being validated. A certificate revocation list is a data structure which contains a signature of the issuing party together with algorithm ID and parameters, the electronic ID of the issuer, the last update date and time, the next scheduled update date and time and a list of revoked certificates. Revoked certificates are given sequence numbers in a sequential order and for each sequence number list the serial number of the certificate being revoked and the date and time of its revocation.

To retrieve the current Certificate Revocation List (CRL) of all relevant CA's, a station can send a CRL Request message to the station and receive the list back. In some systems, it may be preferred to use a common repository which maintains authenticated copies of CRL's for all CA's in the entire system. A CRL may then be obtained by CRL_Request message directed to the common repository and receive the response back via CRL_Reply message from the common repository. When using a common repository, a CA may send a copy of its current CRL to the common repository using the CRL_Store message. Once it has been successfully received by the common repository, a reply will be sent to the sending CA. As discussed in conjunction with the verification process of FIG. 4, current CRL's are very desirable in order to properly authenticate and verify encrypted material.

Figure 16:
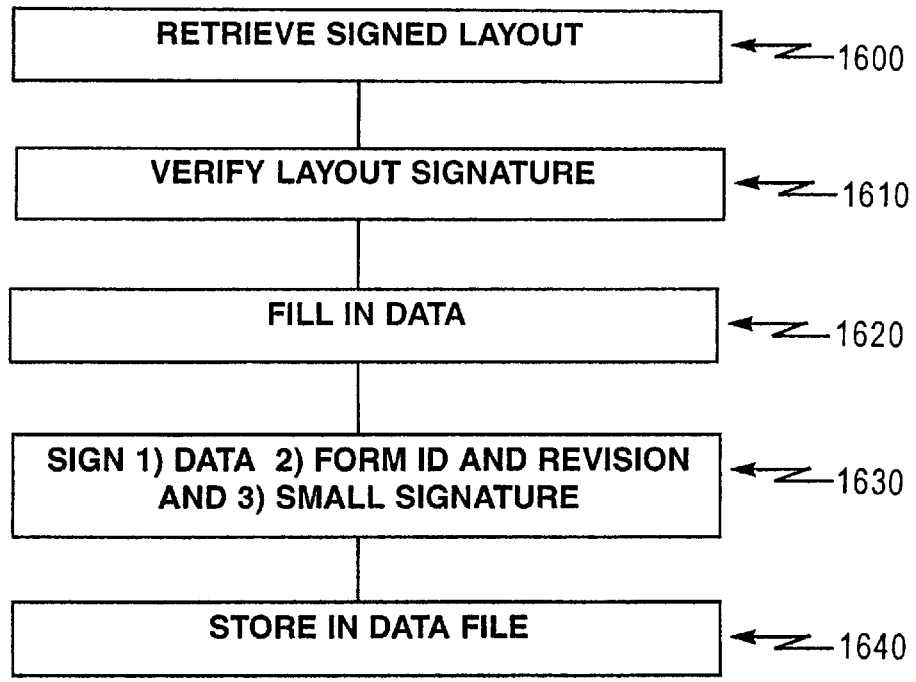
FIG. 16 is a flow chart of a process for adding a filled in form to a form's data base.

FIG. 16 is a flow chart of a process for adding a filled in form to a form's data base. A user, such as a client process retrieves a signed layout from the data base such as that shown in FIG. 1. The layout signature is verified as discussed above (1610). The data values are then filled in for the various data fields or cells (1620) and the user filling in the data signs (1) the data, (2) the form ID and revision and (3) the bits of the layout authorizing signature (1630). This corresponds to the illustration in FIG. 3. The signed data format is then stored in signed data format area 120 of FIG. 1.

Figure 17:
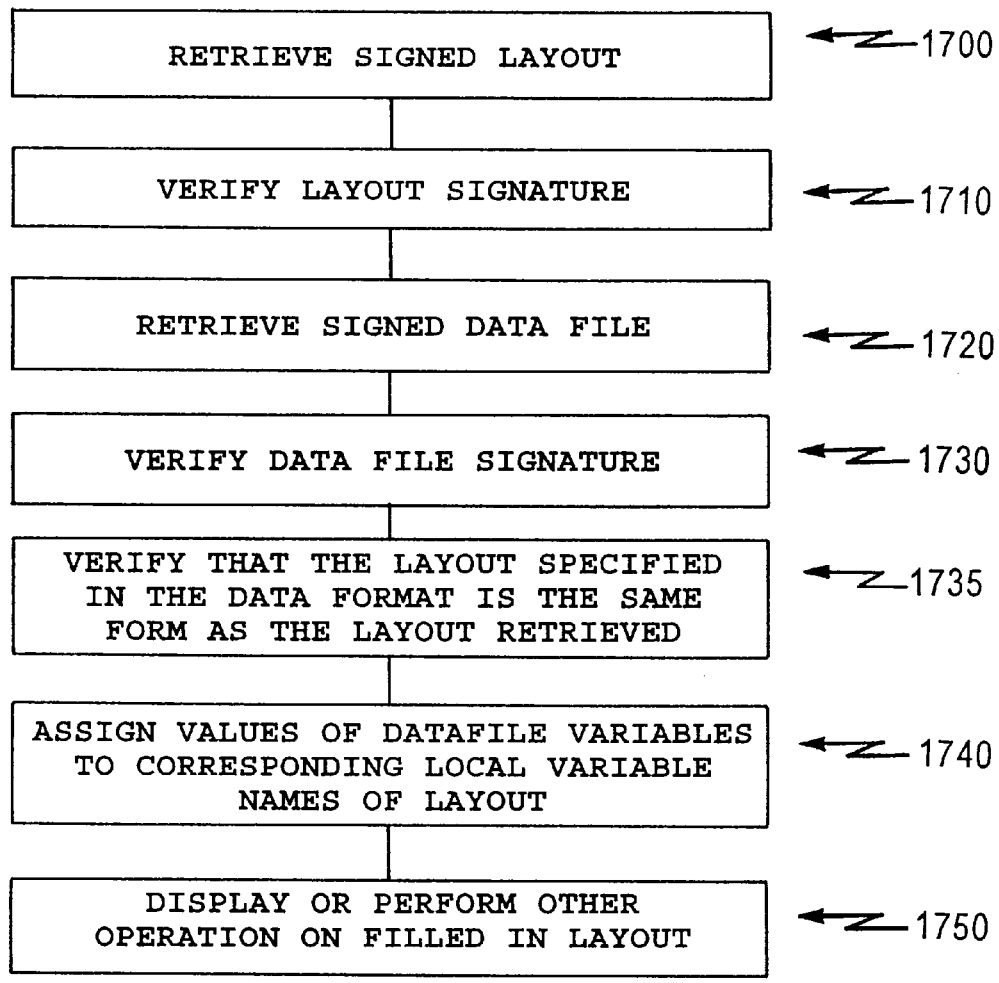
FIG. 17 is a flow chart of a process for retrieving a filled in form from a form's data base.

FIG. 17 is a flow chart of a process for retrieving a filled in form from a form's data base. Initially, a signed layout is retrieved (1700). The layout signature is verified to ensure that the layout is authentic (1710). A signed data file is retrieved (1720) and the signature to the data file is verified (1730). One then verifies that the layout specified in the data format is the same form as the layout retrieved (1735) and values of data file variables are assigned to corresponding local variable names of the layout (1740). The filled in form can then be displayed or can be the object of other operations as desired.

Figure 18:
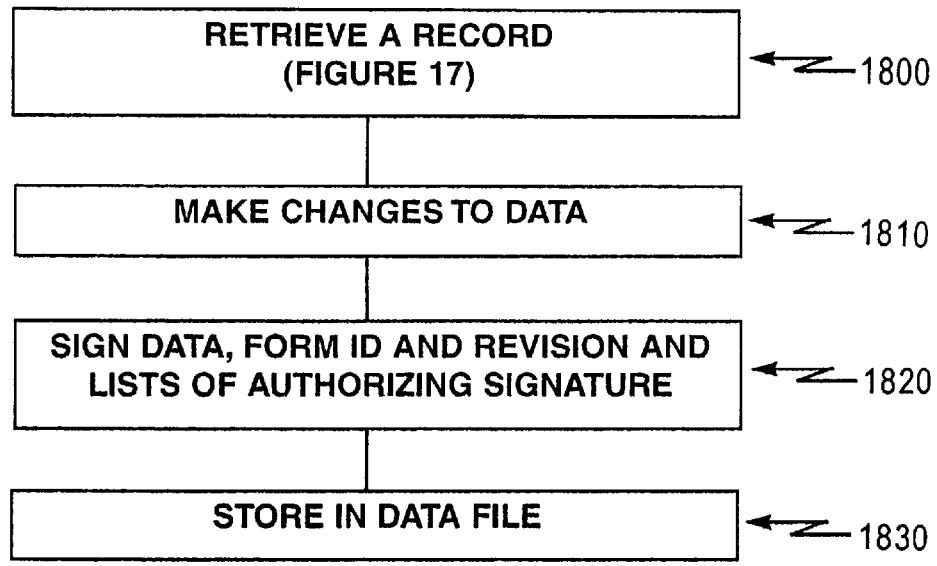
FIG. 18 is a flow chart of a process for editing a filled in form in a form's data base.

FIG. 18 is a flow chart of a process for editing a filled in form. A record is retrieved as shown in FIG. 17 (1800) and changes are made to the data (1810). The revised data is placed in the data format together with the form ID and revision number and the bits of the authorizing signature and signed (1820). The modified data format is stored in the data file (1830).

With respect to deletion of a record, the normal security procedures necessary to ensure that write/delete is authorized to a user are employed to ensure that a record will not be inappropriately deleted.

Figure 19:
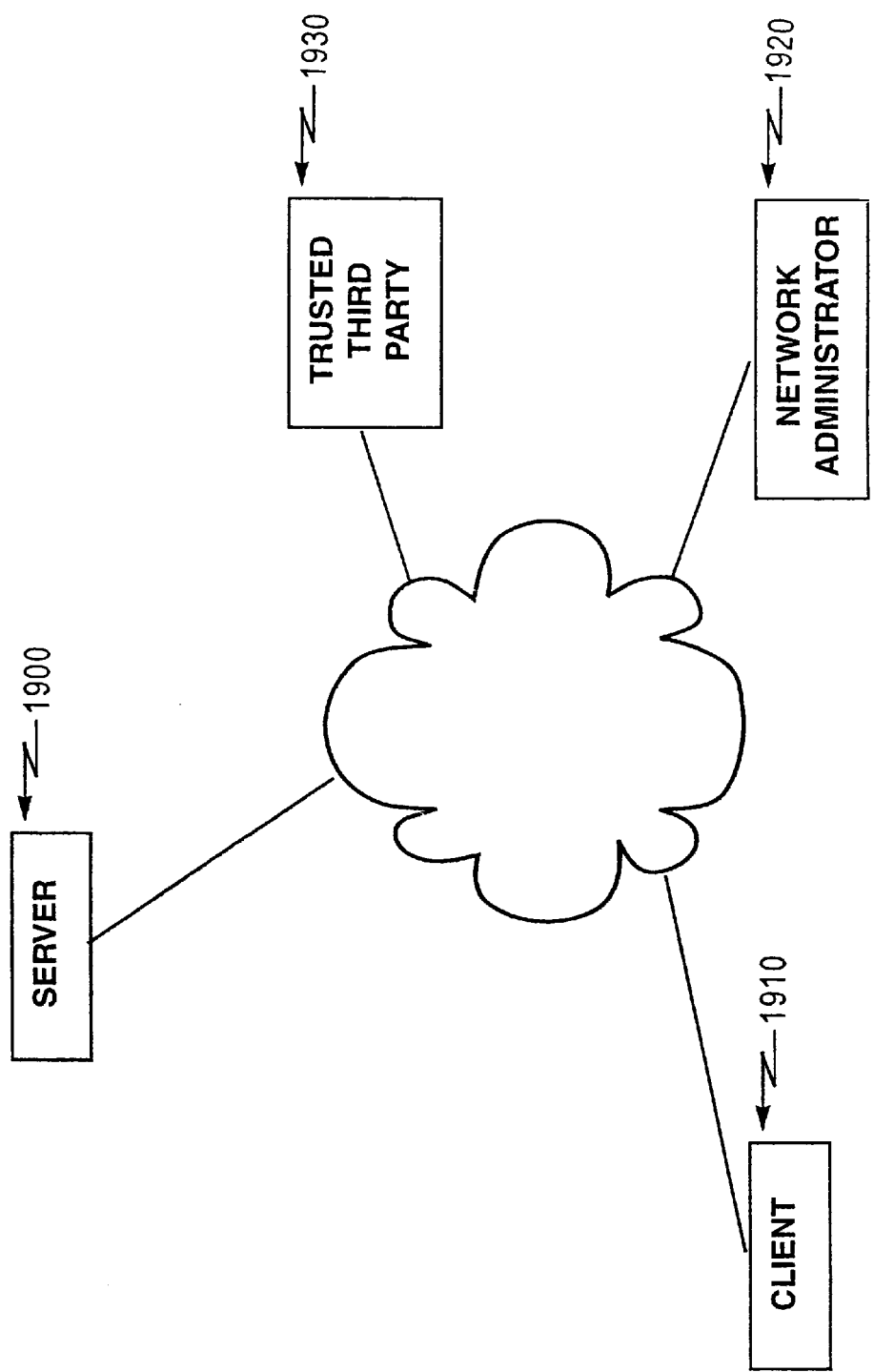
FIG. 19 illustrates an exemplary network environment useful for distributing new layout versions to clients and servers.

FIG. 19 illustrates an exemplary network environment useful for distributing new layout versions to client's and servers. As shown in FIG. 19, a client 1910, a server 1900, a trusted third party 1930 and a network administrator 1920 are all interconnected over a network 1940. When new layouts are to be distributed to forms users, a central authority, such as a network administrator 1920 can send the signed revised layout to each of the clients and servers over the network. Each of the clients and servers can validate the signature of the revised layout originator using the services of a trusted third party (1930) to ensure a valid public key. Once the revised layout has been authenticated and verified, it can be stored at the client and/or the server for use.

Figure 20:
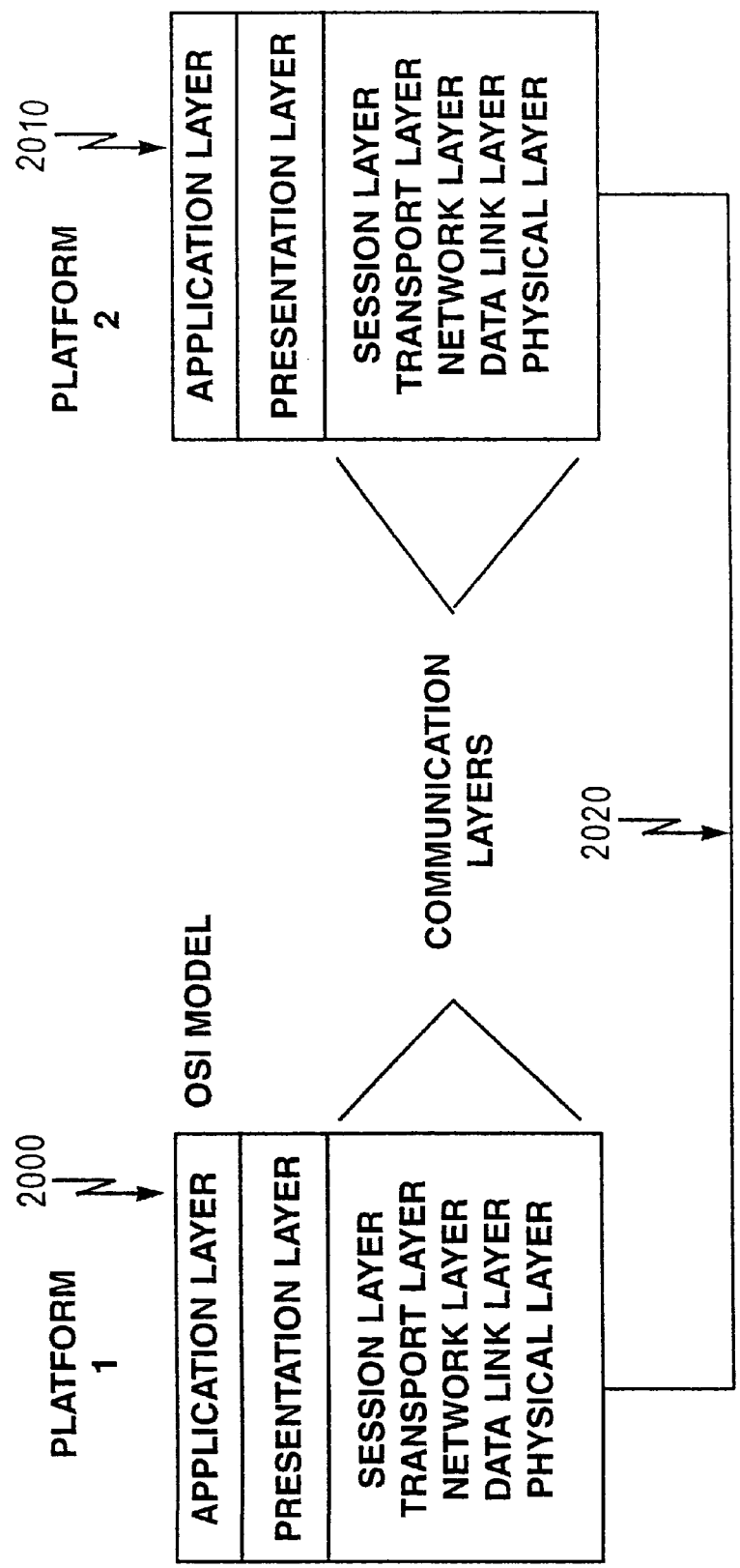
FIG. 20 illustrates use of the invention across different platforms.

FIG. 20 illustrates use of the invention across different platforms. The first platform, is a computer of one type and the second platform is a computer of a different type. These are respectively shown at 2000 and 2010. The different platforms are configured for communications over a communications link 2020. In FIG. 20, each of the platforms is shown with the respective software layers associated with the international standards organization open systems interconnect model (OSI model). The communication layers from the physical layer through the session layer are typically implemented in software on network interface cards, such as those utilized for TCP/IP communications. The presentation layer may be part of an application layer or part of the network interface software depending on implementation. In accordance with the invention, the presentation layer functions include the encryption/decryption verification and validation of signatures. To ensure standardization, preferably the presentation layer is included with the application software and not with the network interface card. While the application can be ported to different platforms, the data and the layouts are platform independent and both the application/presentation layers treat them identically, regardless of platform. The platform differences are accounted for in the communications layers and in the porting process.

Thus, the invention permits interchange and use of data across different platforms in a platform independent manner.

Figure 21:
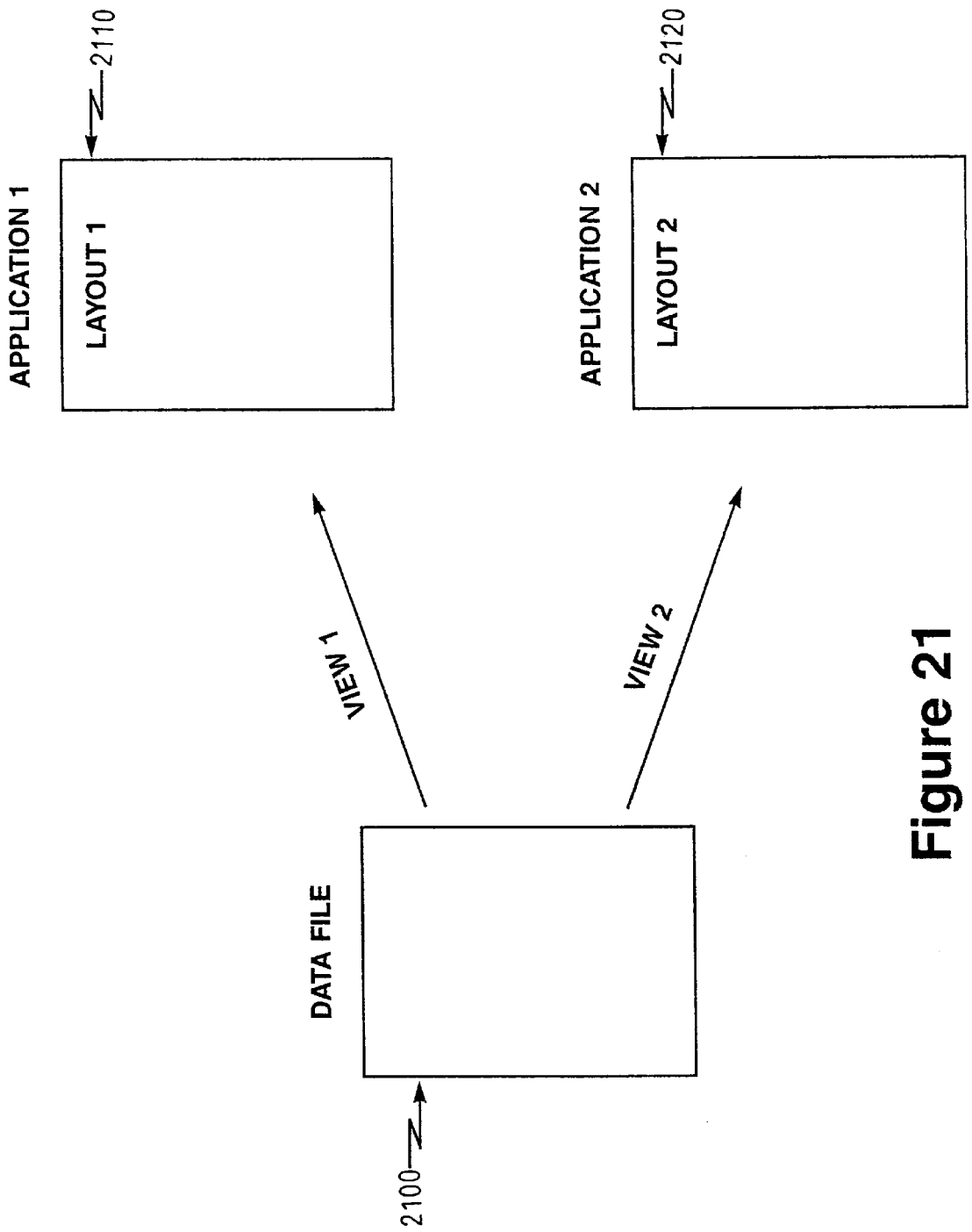
FIG. 21 illustrates use of the invention across different applications.

FIG. 21 illustrates use of the invention across different applications. A data file, 2100, may need to be utilized or shared by different applications such as application 1 (2110) and application 2 (2120). Each application may require a different view of the data from the data format 2100. Layouts 1 and 2 which represent the different views of the data format, may be treated in the same manner as different revisions of a layout. That is, the semantics for the view required for the particular application are guaranteed to be valid notwithstanding different layouts of the data, in the same manner that a revision of a layout retains consistent semantics with respect to the meaning of the data. This is analogous to having a generic layout specified for the data format in which layouts 1 and layout 2 are a species which are both valid within the genus. In this way, even though different layouts are utilized to work with the data in different applications, both layouts retain the consistent semantics with respect to the data and can perform all of the functionality needed with respect to the data as if they were handled by the same application.

There has thus been described new inventive techniques for handling forms data in a manner which ensures the integrity of the data and the layout of the forms in a manner which overcomes the problems of the prior art.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

We claim:

1. A method of storing forms, comprising the steps of:
  a. storing at least one form layout;
  b. applying a layout originator's signature to said form layout; and
  c. separately storing form data containing the layout originator's signature applied to said form layout.

2. The method of claim 1 further comprising storing a data entry person's signature of said form data using encryption.

3. The method of claim 2 further comprising validating one of said layout originator's signature and said data entry person's signature using a public key infrastructure.

4. The method of claim 3 in which said public key infrastructure is controlled by a trusted third party.

5. The method of claim 1 in which said form layout and said form data are linked by a common schema.

6. The method of claim 5 in which said one form layout is replaced by a different form layout based on said common schema.

7. A method of retrieving form data, comprising the steps of:
  a. retrieving a form layout;
  b. retrieving form data which contains a reference to a version of said form layout; and
  c. associating values of data elements of said form data with corresponding data elements of said version of said form layout.

8. The method of claim 7 in which at least one of said layout and said form data is signed using encryption.

9. The method of claim 7 further comprising editing said values of data elements.

10. The method of claim 9 further comprising:
  storing edited values of data elements in revised form data; and
  signing said revised form data together with said reference to a version of said form layout.

11. Apparatus for processing form data, comprising:
  a. a processor;
  b. data storage connected to said processor, said data storage storing at least one form layout and data, said data including a signature applied to the form layout, for filling in at least one instance of said form layout.

12. Apparatus of claim 11, in which said data is signed.

13. Apparatus of claim 12 in which said processor is configured to verify the authenticity of a signature applied to one of said form layout and said data.

14. Apparatus of claim 13 in which said processor is configured to verify the authenticity of a signature applied to one of said form layout and said data before permitting the use of said data with said form layout.

15. A system for processing form data comprising:
  a. a server having a database storing at least one form layout and separately storing at least one record containing form data for filling in at least one instance of a form layout and a signature applied to said form layout;
  b. a client process running on a computer; and
  c. a network connecting said computer to said server; in which said client process is configured to request a copy of a record to be associated with a copy of at least one form layout.

16. Apparatus of claim 15 in which said client process is configured to verify the authenticity of a signature to one of said form layout and said data.

17. Apparatus of claim 15 in which a trusted third party is connected to said network and provides information to verify the authenticity of signatures to form layouts and form data.

18. A computer program product, comprising:
  a. a storage medium;
  b. a computer program stored on said storage medium for processing form data stored on said medium comprising at least one of a form layout and form data; and
  c. a layout originator's signature applied to a form number and revision of said form layout stored in said storage medium.

19. The computer program product of claim 18 in which at least one of said form layout and form data are signed using encryption.

20. The computer program product of claim 19 in which said form layout comprises (1) layout information, (2) said form number and revision, and (3) said layout originator's signature applied to the form number and revision.

21. The computer program product of claim 19 in which said form data comprises (1) data information, (2) said form number and revision, and (3) said layout originator's signature applied to the form number and revision.

22. A method of storing forms, comprising the steps of:

storing at least one form layout;

storing a form number and revision;

storing a layout originator's signature using encryption applied to said form number and revision; and separately storing form data containing a reference to said form layout.

23. A method of filling in a secure form, comprising the steps of:

retrieving from the secure form a layout originator's signature applied to a form layout;

verifying the layout originator's signature applied to the form layout; and filling in the secure form with form data using the form layout.

24. The method of claim 23, further comprising signing the form data and the layout originator's signature.

25. The method of claim 24, further comprising signing a form number and revision of the form layout.

26. A method of verifying a filled in, secure form, comprising the steps of:

verifying a layout originator's signature applied to a form number and revision of a form layout of the secure form; and verifying a data entry person's signature applied to form data of the filled in, secure form.

27. The method of claim 26, further comprising verifying a layout originator's signature to the form layout for the secure form.

28. A method of authenticating a body of data, including a plurality of pieces of information, comprising:

storing the body of data, wherein one of the pieces of information includes an identifier of a related object;

applying a first signature to the body of data;

applying a second signature to the identifier of the related object; and storing the signature of the identifier of the related object.

29. The method of claim 28, wherein:

the body of data comprises form data; and the identifier of a related object comprises a form number of a form layout for the form data.

30. The method of claim 28, wherein storing the signature of the identifier of the related object includes storing the signature of the identifier as the one of the pieces of information.

31. A method for verifying a secure body of data, including a plurality of pieces of information, comprising:

accessing one of the pieces of information containing a signature applied to an identifier of a related object;

verifying the signature applied to the identifier of the related object; and verifying another signature that is applied to the secure body of data.

32. The method of claim 31, wherein the body of data comprises form data; and the identifier of a related object comprises a form number of a form layout for the form data.

* * * * *